(12) United States Patent
Levy et al.

(10) Patent No.: US 9,710,843 B2
(45) Date of Patent: *Jul. 18, 2017

(54) SYSTEMS, METHODS, AND DEVICES FOR MEASURING SIMILARITY OF AND GENERATING RECOMMENDATIONS FOR UNIQUE ITEMS

(71) Applicant: Vast.com, Inc., Austin, TX (US)

(72) Inventors: Joshua Howard Levy, Austin, TX (US); David Wayne Franke, Austin, TX (US)

(73) Assignee: VAST.COM, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,468

(22) Filed: Mar. 21, 2016

(65) Prior Publication Data

US 2016/0343058 A1  Nov. 24, 2016

Related U.S. Application Data

(63) Continuation of application No. 14/790,552, filed on Jul. 2, 2015, now Pat. No. 9,324,104, which is a continuation of application No. 13/927,513, filed on Jun. 26, 2013, now Pat. No. 9,104,718.

(60) Provisional application No. 61/774,325, filed on Mar. 7, 2013.

(51) Int. Cl.
G06Q 30/06 (2012.01)
G06F 17/30 (2006.01)
G06N 5/04 (2006.01)

(52) U.S. Cl.
CPC ..... *G06Q 30/0631* (2013.01); *G06F 17/3053* (2013.01); *G06F 17/30554* (2013.01); *G06F 17/30867* (2013.01); *G06N 5/04* (2013.01)

(58) Field of Classification Search
None
See application file for complete search history.

(56) References Cited

U.S. PATENT DOCUMENTS

| | | |
|---|---|---|
| 5,459,656 A | 10/1995 | Fields |
| 5,687,322 A | 11/1997 | Deaton et al. |
| 6,029,195 A | 2/2000 | Herz |
| 6,430,539 B1 | 8/2002 | Lazarus et al. |
| 6,510,406 B1 | 1/2003 | Marchisio |
| 6,539,392 B1 | 3/2003 | Rebane |
| 6,611,726 B1 | 8/2003 | Crosswhite |
| 6,711,581 B2 | 3/2004 | Rebane |

(Continued)

OTHER PUBLICATIONS

U.S. Appl. No. 15/253,007 Including its prosecution history, the cited references, and the Office Actions therein., Not yet published, Franke et al.

(Continued)

*Primary Examiner* — Alan Chen
(74) *Attorney, Agent, or Firm* — Knobbe Martens Olson & Bear LLP

(57) ABSTRACT

The disclosure herein provides methods, systems, and devices for measuring similarity of and generating recommendations for unique items. A recommendation system for generating recommendations of alternative unique items comprises an items information database, a penalty computation engine, a recommendation compilation engine, and one or more computers, wherein the penalty computation engine comprises a customizations filter, a condition filter, and a dissimilarity penalty calculator.

20 Claims, 11 Drawing Sheets

(56) References Cited

U.S. PATENT DOCUMENTS

| | | |
|---|---|---|
| 6,751,600 B1 | 6/2004 | Wolin |
| 6,751,614 B1 | 6/2004 | Rao |
| 6,775,664 B2 | 8/2004 | Lang et al. |
| 6,873,983 B2 | 3/2005 | Ugai et al. |
| 6,886,005 B2 | 4/2005 | Davis |
| 7,013,005 B2 | 3/2006 | Yacoub et al. |
| 7,069,258 B1 | 6/2006 | Bothwell |
| 7,165,119 B2 | 1/2007 | Fish |
| 7,167,871 B2 | 1/2007 | Farahat et al. |
| 7,206,780 B2 | 4/2007 | Slackman |
| 7,225,107 B2 | 5/2007 | Buxton et al. |
| 7,243,102 B1 | 7/2007 | Naam et al. |
| 7,260,568 B2 | 8/2007 | Zhang et al. |
| 7,283,951 B2 | 10/2007 | Marchisio et al. |
| 7,293,017 B2 | 11/2007 | Hurst-Hiller et al. |
| 7,356,430 B2 | 4/2008 | Miguelanez et al. |
| 7,395,170 B2 | 7/2008 | Scott et al. |
| 7,398,201 B2 | 7/2008 | Marchisio et al. |
| 7,433,885 B2 | 10/2008 | Jones |
| 7,440,955 B2 | 10/2008 | Khandelwal et al. |
| 7,444,308 B2 | 10/2008 | Guyon et al. |
| 7,467,232 B2 | 12/2008 | Fish et al. |
| 7,509,321 B2 | 3/2009 | Wong et al. |
| 7,523,047 B1 | 4/2009 | Neal et al. |
| 7,542,947 B2 | 6/2009 | Guyon et al. |
| 7,565,362 B2 | 7/2009 | Brill et al. |
| 7,593,904 B1 | 9/2009 | Kirshenbaum et al. |
| 7,593,934 B2 | 9/2009 | Li et al. |
| 7,596,552 B2 | 9/2009 | Levy et al. |
| 7,603,348 B2 | 10/2009 | He et al. |
| 7,631,008 B2 | 12/2009 | Carson et al. |
| 7,636,715 B2 | 12/2009 | Kalleh |
| 7,647,314 B2 | 1/2010 | Sun et al. |
| 7,657,493 B2 | 2/2010 | Meijer et al. |
| 7,660,581 B2 | 2/2010 | Ramer et al. |
| 7,664,746 B2 | 2/2010 | Majumder |
| 7,672,865 B2 | 3/2010 | Kumar et al. |
| 7,680,835 B2 | 3/2010 | MacLaurin et al. |
| 7,685,197 B2 | 3/2010 | Fain et al. |
| 7,693,818 B2 | 4/2010 | Majumder |
| 7,693,901 B2 | 4/2010 | Ka et al. |
| 7,716,202 B2 | 5/2010 | Slackman |
| 7,716,217 B2 | 5/2010 | Marston et al. |
| 7,716,225 B1 | 5/2010 | Dean et al. |
| 7,716,226 B2 | 5/2010 | Barney |
| 7,725,307 B2 | 5/2010 | Bennett |
| 7,725,451 B2 | 5/2010 | Jing et al. |
| 7,739,408 B2 | 6/2010 | Fish et al. |
| 7,761,447 B2 | 7/2010 | Brill et al. |
| 7,788,252 B2 | 8/2010 | Delli Santi et al. |
| 7,801,358 B2 | 9/2010 | Furmaniak et al. |
| 7,801,843 B2 | 9/2010 | Kumar et al. |
| 7,802,197 B2 | 9/2010 | Lew et al. |
| 7,805,331 B2 | 9/2010 | Demir et al. |
| 7,805,385 B2 | 9/2010 | Steck et al. |
| 7,805,438 B2 | 9/2010 | Liu et al. |
| 7,809,740 B2 | 10/2010 | Chung et al. |
| 7,818,186 B2 | 10/2010 | Bonissone et al. |
| 7,827,060 B2 | 11/2010 | Wright et al. |
| 7,827,170 B1 | 11/2010 | Horling et al. |
| 7,831,463 B2 | 11/2010 | Nagar |
| 7,836,057 B1 | 11/2010 | Micaelian et al. |
| 7,849,030 B2 | 12/2010 | Ellingsworth |
| 7,860,871 B2 | 12/2010 | Ramer et al. |
| 7,865,187 B2 | 1/2011 | Ramer et al. |
| 7,865,418 B2 | 1/2011 | Uenohara et al. |
| 7,870,017 B2 | 1/2011 | Kamath |
| 7,895,193 B2 | 2/2011 | Cucerzan et al. |
| 7,899,455 B2 | 3/2011 | Ramer et al. |
| 7,904,448 B2 | 3/2011 | Chung et al. |
| 7,908,238 B1 | 3/2011 | Nolet et al. |
| 7,912,458 B2 | 3/2011 | Ramer et al. |
| 7,912,713 B2 | 3/2011 | Vair et al. |
| 7,921,068 B2 | 4/2011 | Guyon et al. |
| 7,921,069 B2 | 4/2011 | Canny et al. |
| 7,930,197 B2 | 4/2011 | Ozzie et al. |
| 7,933,388 B1 | 4/2011 | Vanier et al. |
| 7,937,345 B2 | 5/2011 | Schmidtler et al. |
| 7,941,329 B2 | 5/2011 | Kenedy et al. |
| 7,958,067 B2 | 6/2011 | Schmidtler et al. |
| 7,966,219 B1 | 6/2011 | Singh et al. |
| 7,987,261 B2 | 7/2011 | Gamble |
| 8,001,121 B2 | 8/2011 | Wang et al. |
| 8,005,643 B2 | 8/2011 | Tunkelang et al. |
| 8,005,684 B1 | 8/2011 | Cheng et al. |
| 8,005,774 B2 | 8/2011 | Chapelle |
| 8,005,826 B1 | 8/2011 | Sahami et al. |
| 8,015,065 B2 | 9/2011 | Davies |
| 8,024,327 B2 | 9/2011 | Tunkelang et al. |
| 8,024,349 B1 | 9/2011 | Shao et al. |
| 8,027,864 B2 | 9/2011 | Gilbert |
| 8,027,865 B2 | 9/2011 | Gilbert |
| 8,032,405 B2 | 10/2011 | Gilbert |
| 8,051,033 B2 | 11/2011 | Kenedy et al. |
| 8,051,073 B2 | 11/2011 | Tunkelang et al. |
| 8,065,184 B2 | 11/2011 | Wright et al. |
| 8,065,254 B1 | 11/2011 | Das et al. |
| 8,069,055 B2 | 11/2011 | Keen |
| 8,078,606 B2 | 12/2011 | Slackman |
| 8,095,523 B2 | 1/2012 | Brave et al. |
| 8,099,376 B2 | 1/2012 | Serrano-Morales et al. |
| 8,126,881 B1 | 2/2012 | Sethi et al. |
| 8,326,845 B2 | 12/2012 | Sethi et al. |
| 8,375,037 B2 | 2/2013 | Sethi et al. |
| 8,600,823 B1 | 12/2013 | Raines et al. |
| 8,620,717 B1 | 12/2013 | Micaelian et al. |
| 8,868,572 B2 | 10/2014 | Sethi et al. |
| 8,954,424 B2 | 2/2015 | Gupta et al. |
| 9,104,718 B1 | 8/2015 | Levy et al. |
| 9,324,104 B1 | 4/2016 | Levy et al. |
| 9,465,873 B1 | 10/2016 | Franke et al. |
| 2003/0004745 A1 | 1/2003 | Takakura |
| 2003/0088457 A1 | 5/2003 | Keil et al. |
| 2003/0229552 A1 | 12/2003 | Lebaric et al. |
| 2005/0027670 A1 | 2/2005 | Petropoulos |
| 2005/0086070 A1 | 4/2005 | Engelman |
| 2005/0154717 A1 | 7/2005 | Watson et al. |
| 2006/0026081 A1 | 2/2006 | Keil et al. |
| 2006/0248035 A1 | 11/2006 | Gendler |
| 2007/0143184 A1 | 6/2007 | Szmanda |
| 2008/0065425 A1 | 3/2008 | Giuffre et al. |
| 2008/0222010 A1 | 9/2008 | Hudak et al. |
| 2009/0006118 A1 | 1/2009 | Pollak |
| 2009/0112927 A1 | 4/2009 | Chitnis et al. |
| 2012/0005045 A1 | 1/2012 | Baker |
| 2013/0030870 A1 | 1/2013 | Swinson et al. |
| 2014/0100989 A1 | 4/2014 | Zhang |

OTHER PUBLICATIONS

U.S. Appl. 13/924,375 Including its prosecution history, the cited references, and the Office Actions therein., Not Yet Published, Franke et al.

U.S. Appl. 13/938,045 Including its prosecution history, the cited references, and the Office Actions therein., Not Yet Published, Franke et al.

U.S. Appl. 14/060,434 Including its prosecution history, the cited references, and the Office Actions therein., Not Yet Published, Levy et al.

U.S. Appl. 14/566,402 Including its prosecution history, the cited references, and the Office Actions therein., Not Yet Published, Franke et al.

U.S. Appl. 14/795,809 Including its prosecution history, the cited references, and the Office Actions therein., Not Yet Published, Levy et al.

Figure 6

Computing Dissimilarity Penalty

| Prototype | Base Vehicle | Candidate 1 | | Candidate 2 | |
|---|---|---|---|---|---|
| Make | Ford | Chevrolet | | GMC | |
| Model | F-150 | Silverado 1500 | | Sierra 1500 | |
| Body Style | Pickup | Pickup | | Pickup | |
| Penalty | | | 8.90 | | 16.00 |

602

| Customization | Present | Present | Price Difference | Present | Price Difference |
|---|---|---|---|---|---|
| 8 Cylinder Engine | YES | YES | 0.00 | YES | 0.00 |
| Keyless Entry | YES | YES | 0.00 | NO | 295.00 |
| Flexible Fuel | NO | YES | 179.00 | NO | 0.00 |
| 4 Wheel Drive | NO | NO | 0.00 | YES | 3,154.00 |
| Total Difference | | | 179.00 | | 3,449.00 |
| Inverse Variance | | | 0.000001 | | 0.000001 |
| Penalty | | | 0.03 | | 11.90 |

604

| Condition | | | | | |
|---|---|---|---|---|---|
| Year | 2010 | 2012 | 1.83 | 2007 | 4.11 |
| Mileage | 46006 | 30704 | 0.77 | 84034 | 4.77 |
| Price | 24995 | 24995 | 0.00 | 18695 | 5.41 |
| Penalty | | | 2.60 | | 14.29 |

606

| Dissimilarity Penalty | | 11.53 | | 42.19 | |

608

SYSTEMS, METHODS, AND DEVICES FOR MEASURING SIMILARITY OF AND GENERATING RECOMMENDATIONS FOR UNIQUE ITEMS

CROSS-REFERENCE TO RELATED APPLICATIONS

This application is a continuation of U.S. patent application Ser. No. 14/790,552, titled SYSTEMS, METHODS, AND DEVICES FOR MEASURING SIMILARITY OF AND GENERATING RECOMMENDATIONS FOR UNIQUE ITEMS, filed on Jul. 2, 2015, which is a continuation of U.S. patent application Ser. No. 13/927,513, titled SYSTEMS, METHODS, AND DEVICES FOR MEASURING SIMILARITY OF AND GENERATING RECOMMENDATIONS FOR UNIQUE ITEMS, filed on Jun. 26, 2013, issued as U.S. Pat. No. 9,104,718, which claims the benefit of U.S. Provisional Application No. 61/774,325, titled SYSTEMS, METHODS, AND DEVICES FOR MEASURING SIMILARITY OF AND GENERATING RECOMMENDATIONS FOR UNIQUE ITEMS, filed on Mar. 7, 2013. Each of the foregoing applications is hereby incorporated by reference herein in its entirety.

BACKGROUND

Field

The disclosure relates generally to the field of measuring similarities, and more specifically to systems, methods, and devices for measuring similarities of and generating sorted recommendations for unique items.

Description

Collaborative filtering systems can be used to recommend items to a user based on a user's previously expressed preferences. In general, a collaborative filter collects information about the preferences of many users and uses that information to predict the preferences of individual users. For example, if a user streams videos from a streaming video service, the service may utilize a collaborative filter to generate recommendations of alternate videos to stream based on an estimated likelihood that the user will be interested in the alternate videos. In another example, a user may purchase books from a bookseller, and the bookseller may utilize a collaborative filter to make recommendations to the user of alternate books based on an estimated likelihood that the user will be interested in the alternate books.

Collaborative filtering has limitations in its effectiveness, particularly when the relevant products or services are unique. Typically, a collaborative filter will assume that all similar items are identical. For example, when a user streams a particular movie, the collaborative filter assumes that all users who stream that movie view the same content, which is typically a valid assumption for a video streaming service. In another example, a collaborative filter that makes recommendations of books will typically assume that all customers that purchase a particular book are buying identical content. Accordingly, it can be advantageous to have systems, devices, and/or methods for measuring similarity of and generating recommendations for unique items.

SUMMARY

The disclosure herein provides methods, systems, and devices for measuring similarities of and generating recommendations for unique items, customizable items, and/or items having varying conditions, such as used vehicles and homes.

In some embodiments, a recommendation system for generating recommendations of alternative unique items comprises: an items information database configured to store data relating to unique items; a penalty computation engine configured to calculate a dissimilarity penalty, the dissimilarity penalty at least partially generated based on a magnitude of dissimilarity between a selected item and an alternative item, the penalty computation engine comprising: a customizations filter configured to calculate a customization score, the customization score representing an estimated preference impact of a difference between at least one customization attribute of the selected item and at least one customization attribute of the alternative item; a condition filter configured to calculate a condition score, the condition score representing an estimated preference impact of a difference between at least one condition attribute of the selected item and at least one condition attribute of the alternative item; wherein data representing the at least one customization attribute and the at least one condition attribute of the alternative item is configured to be stored in the items information database; and a dissimilarity penalty calculator configured to generate the dissimilarity penalty by combining at least the customization score and the condition score; a recommendation compilation engine configured to generate a recommendation of alternative unique items, wherein the recommendation compilation engine is configured to electronically communicate with the penalty computation engine to calculate dissimilarity penalties for each of a plurality of alternative unique items, the recommendation of alternative unique items comprising a ranking of at least a portion of the plurality of alternative unique items, the ranking based at least partially on the calculated dissimilarity penalties; and one or more computers configured to operate the recommendation compilation engine, wherein the one or more computers comprises a computer processor and an electronic storage medium.

In certain embodiments, a computer-implemented method for generating recommendations of alternative unique items comprises: receiving electronic data indicating a selection of a selected item; calculating, using a computer system, a customization score for each of a plurality of alternative unique items, the customization score representing an estimated preference impact of a difference between at least one customization attribute of the selected item and at least one customization attribute of the alternative unique item; calculating, using the computer system, a condition score for each of the plurality of alternative unique items, the condition score representing an estimated preference impact of a difference between at least one condition attribute of the selected item and at least one condition attribute of the alternative unique item; generating, using the computer system, a dissimilarity penalty for each of the plurality of alternative unique items by combining at least the customization score and the condition score; and generating, using the computer system, a recommendation of alternative unique items, the recommendation comprising a ranking of at least a portion of the plurality of alternative unique items, the ranking based at least partially on the generated dissimilarity penalties; wherein the computer system comprises a computer processor and electronic memory.

In some embodiments, a computer-readable, non-transitory storage medium having a computer program stored thereon for causing a suitably programmed computer system to process by one or more processors computer-program code by performing a method for generating recommendations of alternative unique items when the computer program is executed on the suitably programmed computer system comprises: receiving electronic data indicating a selection of a selected item; calculating, using a computer system, a customization score for each of a plurality of alternative unique items, the customization score representing an estimated preference impact of a difference between at least one customization attribute of the selected item and at least one customization attribute of the alternative unique item; calculating, using the computer system, a condition score for each of the plurality of alternative unique items, the condition score representing an estimated preference impact of a difference between at least one condition attribute of the selected item and at least one condition attribute of the alternative unique item; generating, using the computer system, a dissimilarity penalty for each of the plurality of alternative unique items by combining at least the customization score and the condition score; and generating, using the computer system, a recommendation of alternative unique items, the recommendation comprising a ranking of at least a portion of the plurality of alternative unique items, the ranking based at least partially on the generated dissimilarity penalties; wherein the computer system comprises a computer processor and electronic memory.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present invention are described in detail below with reference to the drawings of various embodiments, which are intended to illustrate and not to limit the invention. The drawings comprise the following figures in which:

FIG. 6 depicts an example of some portions of a dissimilarity penalty calculation.

DETAILED DESCRIPTION OF THE EMBODIMENTS

Figure 1:
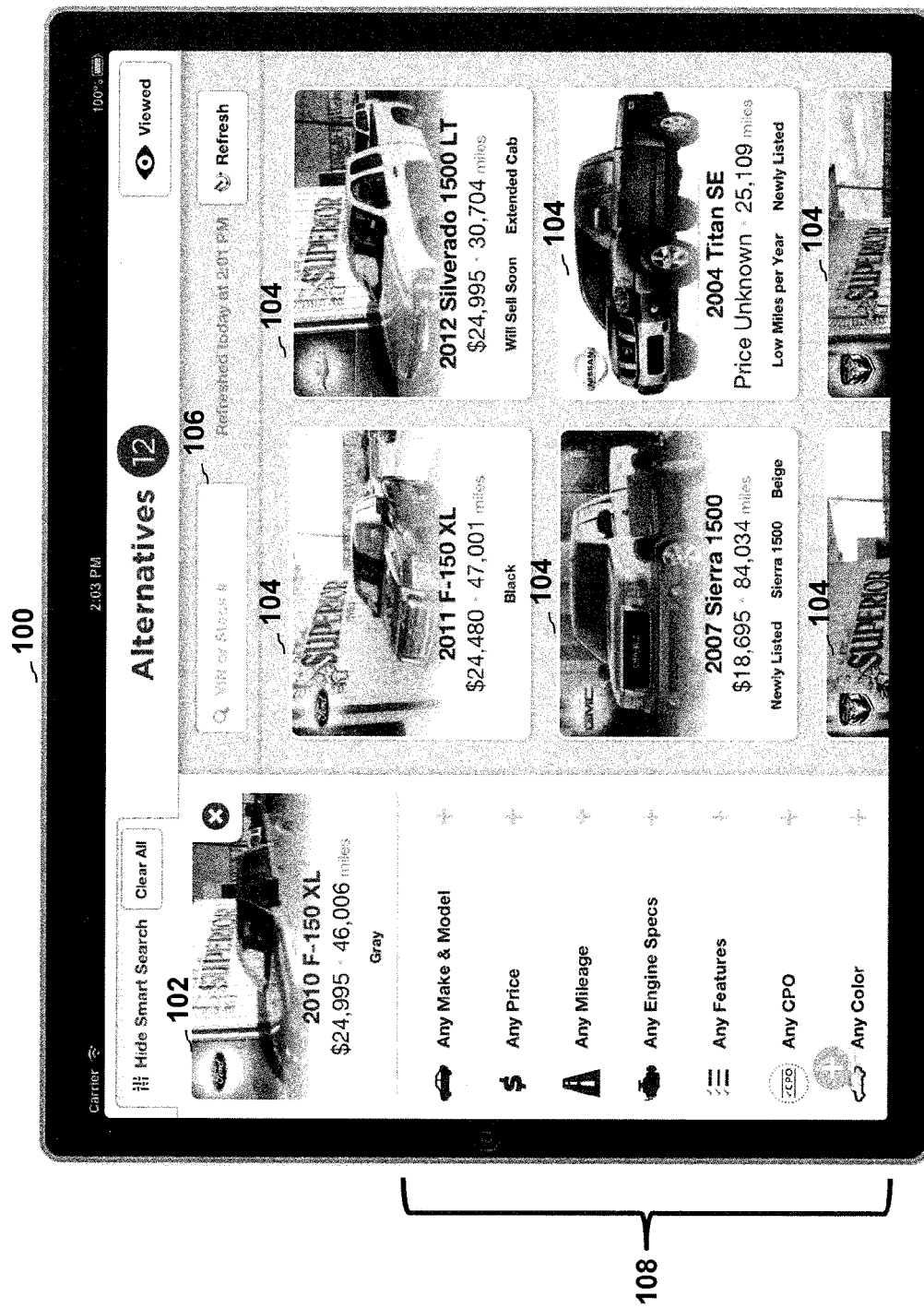
FIG. 1 is an embodiment of a schematic diagram illustrating a user access point system.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The disclosure herein provides methods, systems, and devices for measuring similarities of and generating recommendations for unique items, customizable items, and/or items having varying conditions, such as used vehicles, homes, commercial real estate, household goods, collectibles, automotive components, and the like. In an embodiment, a system receives information indicating an item a user is interested in. The system is configured to compare that item to various alternate items and to return a list of alternate items, the list being sorted by the estimated likelihood that the user will also be interested in each of the alternate items. For example, a system as described herein can be configured to generate a sorted list of used vehicle listings that a user may be interested in, based on the user's expressed interest in a different used vehicle listing.

Collaborative filtering systems can be used to recommend items to a user based on a user's previously expressed preferences. For example, a bookseller may use a collaborative filtering system that makes recommendations of alternative books to users; however, the system will typically assume that all customers that purchase a particular book are buying identical content. The bookseller may make distinctions between media format, for example, hardcover, softcover, electronic, audio, etc., but the collaborative filter typically does not take that information into account in generating recommendations.

When unique items are being sold, a collaborative filter alone may not be sufficient to make a useful recommendation to a user of alternative items based on the user's previously expressed interests. For example, used vehicles are unique. No used vehicle has the exact same condition or customization as any other used vehicle, limiting the effectiveness of a collaborative filter that assumes all similar items are identical. Therefore, it is desirable to have a system for making useful recommendations of customized and precisely conditioned items, such as used vehicles and homes.

In an embodiment, a recommendation system decomposes information describing unique items to determine the unique items' prototypes, customizations, conditions, and/or statuses in the marketplace. The system can be configured to take into account each of these factors in generating estimated likelihoods that a user will be interested in alternate items based on the user's expressed interest in a base item or multiple base items. For example, a recommendation system can be configured to perform collaborative filtering with respect to prototypes, but also to weigh the differences in value of various customizations, evaluate differences in condition and marketplace status, and then combine some or all of this information to estimate more accurately which alternate items a user may be interested in based on the user's expressed interest in the base item or items.

In some embodiments, a recommendation system decomposes a selected item and various alternative items into their prototypes, customizations, conditions, and/or statuses in the marketplace. The system can be configured to calculate a score for each of the proto-types, customizations, conditions, and/or statuses of each alternative item as compared to the selected item. In some embodiments, the recommendation system is configured to normalize the various scores and to combine them together to produce a single dissimilarity penalty or score. In some embodiments, the lower the value of the dissimilarity penalty, the more similar the items are. For example, a dissimilarity penalty of zero would indicate identical items. The dissimilarity penalty for each alternative item can then be used to generate a recommendation comprising a sorted list of alternative items, with items having lower dissimilarity penalties being at the top of the list.

With respect to the various scores, in some embodiments a collaborative filter may be used to compare the prototypes of an alternative item and the selected item. The collaborative filter can generate a score indicating how similar the prototypes of the two items are. However, when dealing with unique items, a better recommendation can be generated by also or alternatively calculating one or more scores that indicate at least partially a similarity of an alternative item to the selected item with respect to the items' customizations, conditions, and/or statuses. Therefore, in some embodiments, a customization score is calculated to indicate at least partially a similarity between the customizations of the alternative item and selected item. Condition and/or status scores may also be calculated.

Embodiments of recommendation systems as described herein address deficiencies in merely using collaborative filters to recommend alternative items, especially when dealing with items that are unique, customized, and/or that have varying conditions or marketplace statuses. By considering differences in customizations, condition, and status, alone or in combination with a collaborative filter, recommendation systems described herein can be configured to generate more accurate and/or more useful recommendations of alternative items than merely using a collaborative filter.

In some embodiments, a prototype is a definition of a category in which, disregarding customization, condition, or marketplace status, all items within that category are considered to be sufficiently interchangeable. For example, a used vehicle prototype may comprise a year, make, and model, such as "2001 Honda Accords." In some embodiments, a prototype may be defined more narrowly and comprise, for example, a year, make, model, trim, and body style (for example, "2001 Honda Accord LX Sedans"). In some embodiments, a prototype may be defined more broadly and consist of, for example, several years of a similar car make or several years of a car make and body style. In some embodiments, a prototype may be defined by at least partially, for example, a style of vehicle, such as crew cab trucks or extended bed trucks. The precise scope of a prototype can be configured based on a desired level of interchangeability. In some embodiments, a training system or engine analyzes data containing indications of user preferences to estimate the interchangeability of the items included in various prototype definitions and to then enable setting of the scope of the prototype definitions based on the estimated interchangeability of the various items.

A customization of a used vehicle may comprise, for example, the engine size, the type of material used for the interior of a car (for example, leather versus cloth), the color of the car, and the like. A condition of a used vehicle may comprise, for example, the number of miles on the odometer, whether the title is clean, whether the vehicle has been in an accident, and the like. The status of a used vehicle in the marketplace may comprise, for example, the listing price of the car, where the car is listed for sale geographically, whether the car is offered for sale by a dealer or a private seller, and the like.

In various embodiments described herein, recommendation systems are configured to provide useful recommendations by taking into account collaborative filtering on prototypes, customizations of various items, and the conditions and marketplace statuses of various items, and by combining all or some of these considerations to produce a single recommendation. If, on the other hand, a recommendation system for unique items was based solely on collaborative filtering that assumes similar items are identical, the system would likely produce less useful recommendations. For example, a collaborative filter may learn that Toyota Camrys are desirable to customers who have expressed interest in Honda Accords. However, a Camry that differs wildly in terms of its luxury and performance features, its condition, and/or its market status from an Accord a user has expressed interest in will not be a useful recommendation. Therefore, when a recommendation system takes into account various customizations, conditions, and/or market statuses, the recommendation system will likely be able to make more useful recommendations of cars that would be of interest to the user.

Although the embodiments described herein are generally described with respect to recommending used vehicles to users, the embodiments described herein are applicable in other markets where items and/or services are unique, customizable, and/or have varying conditions. For example, in real estate, a system can be configured to define a prototype in terms of a neighborhood description, type of residence, size of residence, and the like. Customizations can include flooring choices, the presence or absence of garages and pools, and the like. Condition and market status can include the year built, the price per square foot, the listing price, the geographic area, and the like. The neighborhood description for a real estate prototype may include, for example, the zip code, school attendance zone, etc. The type of residence in a real estate prototype may include, for example, single family residence versus multi-family residence. The size may include the number of bathrooms, the number of bedrooms, the total square feet, etc. The embodiments described herein may also apply to various other types of items, such as existing homes, commercial real estate, household goods, customized electronics, customized goods, clothing, automotive components, collectibles, sporting goods, toys, hobby products, gift items, and/or various other types of unique or customizable products or items or products or items having various conditions offered for sale.

As an example of the embodiments described herein being applied to services offered for sale, a person looking to hire a window washing service may be interested in recommendations of alternative window washing services. A system could be configured to define a prototype in terms of, for example, whether a window washing service is a residential or commercial window washing service. Customizations could include the types of tools each window washing service uses, the specific capabilities of each window washing service, and/or the like. Condition and market status can include the price of each service, the geographic location of each service, and/or the like. These techniques may also be applied to various other services, such as dog walking services, computer repair services, car repair services, medical services, insurance services, and various other types of services.

In an embodiment, a base listing or group of listings is provided to a recommendation system to indicate a used vehicle listing or listings that a user has expressed interest in. The recommendation system is configured to compute a dissimilarity penalty between the base listing or listings and various alternative vehicle listings. A separate dissimilarity penalty is calculated for each alternative vehicle listing. The recommendation system can be configured to then produce a sorted list of alternatives or candidates by sorting the candidates based on the dissimilar penalty to provide only the most relevant alternate listings to a user.

Each calculated dissimilarity penalty is a quantitative indication of how similar each alternative vehicle is to the base vehicle or vehicles or how likely it would be that the user would be interested in the alternative vehicle. For example, if an alternative vehicle listing is identical or perfectly substitutable to the base vehicle, the dissimilarity penalty may be zero. If an alternative vehicle listing is only slightly different than the base vehicle, the dissimilarity penalty may be, for example, two. If an alternative vehicle listing has more significant differences than the base vehicle, the dissimilarity penalty may be, for example, ten or even much larger. In some embodiments, the recommendation system can be configured to disregard dissimilarity penalties higher than a certain threshold, such as 1000, and/or to consider any dissimilarity penalty greater than a certain threshold as indicating two items are completely dissimilar and not interchangeable at all. It should be noted that the dissimilarity penalty, although generally described as indicating the amount of "difference" or "similarity" between two items, may be configured to take into account more than just the raw "differences" or "similarities" between two items. For example, the calculation of a dissimilarity penalty can be configured to take into account what the relative values are of various customizations, how likely a user will be interested in various customizations or conditions, how far a user will likely want to travel to purchase a used vehicle, etc.

In some embodiments, a recommendation system can be configured to calculate dissimilarity penalties by combining multiple Mahalanobis distances. A Mahalanobis distance is a measurement that uses correlations between various variables to determine the similarity of one set of data to a base set of data. The Mahalanobis distance between vectors v1, v2 is $sqrt((v1-v2)^T * S^{-1} * (v1-v2))$, where T denotes a transpose, and $S^{-1}$ is an inverse covariance matrix. In some embodiments, other types of calculations are used to calculate dissimilarity penalties, in addition to or in lieu of Mahalanobis distance measurements, for example, linear regressions, nonlinear regressions, nearest neighbor analysis, and the like.

In some embodiments, four dissimilarity penalties are calculated: one using a collaborative filter, one using a customization penalty calculation, one using a condition penalty calculation, and one using a status penalty calculation. In some embodiments, the condition and status penalty calculation are combined into one calculation. The multiple dissimilarity penalties can then be combined to generate an overall dissimilarity penalty for each alternative item. In some embodiments, one or more of the dissimilarity penalties are normalized before being combined, for example, by using a Mahalanobis distance calculation. In some embodiments, one or more of the dissimilarity penalties are normalized by being converted to a probability or log(probability) before being combined. In other embodiments, various other methods of normalization may be used. In some embodiments, different weights are applied to each dissimilarity penalty, for example by multiplying one or more raw dissimilarity penalties or normalized dissimilarity penalties by a predetermined factor, to result in some penalties being weighted higher than others in the combination process.

A collaborative filter of a recommendation system can be configured to estimate a probability that a user will be interested in a candidate or alternative listing given the user's preferences and the prototypes of the base and alternative items. The user's preferences may include, for example, a history of other prototypes the user has been exposed to and labels of which prototypes are relevant. In some embodiments, the probability is assumed to be the parameter of binomial distribution whose variance is then used with the probability to compute a Mahalanobis distance for the candidate. This Mahalanobis distance is a nonlinear mapping converted from a probability (i.e. high value implies high relevance) to a penalty (i.e. low value implies high relevance) commensurate with the other Mahalanobis distance calculations.

A customization filter of a recommendation system can be configured to calculate a penalty derived from a model that predicts the preference impact of different customization options. The predicted preference impact may comprise a predicted impact on price and/or various other criterion or attributes that may affect a user's preference for one item as compared to another item. For example, for a pair of vehicles, their customization penalty can be computed as the Mahalanobis distance from the origin for a single vector with nonzero elements that contains the price impact of options present on one vehicle but not the other. A condition filter of a recommendation system can be configured to calculate a condition penalty for a pair of vehicles by computing the Mahalanobis distance on vectors describing various condition attributes, such as year, mileage, and price. A status filter of a recommendation system can be configured to similarly calculate a status penalty that takes into account geographic location, whether the vehicle is being offered for sale by a dealer or a private seller, and other marketplace status attributes. In some embodiments, the marketplace status attributes are combined with the condition attributes to calculate a single Mahalanobis distance incorporating both condition and status attributes.

The multiple Mahalanobis distance calculations used in various systems as described herein can be configured to utilize inverse covariance matrices that can be created using training data and a training system. The training data may be, for example, collected from logs of user behavior on various websites that display cars for sale to consumers. In some embodiments, when a consumer expresses interest in a pair of vehicles, that interest is interpreted as a signal of the relevance of the two vehicle prototypes and can be utilized to generate training vectors describing the differences in customization, condition, and/or status for the two vehicles.

FIG. 1 is an embodiment of a schematic diagram illustrating a user access point system 100. The user access point system 100 can be configured to communicate with a recommendation system as shown and described in FIG. 2. The user access point system 100 comprises a display and user interface portion displaying a selected item 102, one or more alternate items 104, a search box 106, and filters 108. In the example shown in FIG. 1, the user access point system 100 indicates that a user has selected a selected item 102. In this example, the user has selected a 2010. Ford F-150 XL pickup truck. The user access point system 100 is displaying multiple alternative items 104 that the recommendation system has determined may be of interest to the user. The user access point system 100 can be configured to display the alternative items 104 in a sorted order of relevance, as determined by the recommendation system by computing dissimilarity penalties for each alternative item 104 versus the base or selected item 102. In some embodiments, the user access point system 100 is configured to enable a user to select one of the alternative items 104, changing the selected item 102 to be that alternative item 104. The user access point system 100 can be configured to then request a new set of sorted alternative items 104 from a recommendation system based on the new anchor item or selected item 102.

The user access point system 100 comprises filters 108 to allow the user to further filter the displayed alternate items 104. For example, a user may indicate that the user is only interested in items that are a certain make and model, within a certain price range, within a certain mileage range, etc. The user access point system 100 can also be configured to enable a user to search for a specific vehicle or listing using the search box 106. For example, a user can insert a VIN number or stock number in the search box 106 and search for that specific item. In some embodiments, the user access point system 100 is configured to allow a user to select an alternate item 104. When the user selects the alternate item 104, the user access point system 100 can be configured to display additional information about that item to the user. In addition, the user access point system can be configured to send an indication to a recommendation system that the user is interested in that particular alternate item 104. The recommendation system can be configured to then develop a sorted listing of recommended alternates to the selected alternate item 104 and send the sorted list to the user access point system 100 for display to the user.

Figure 2:
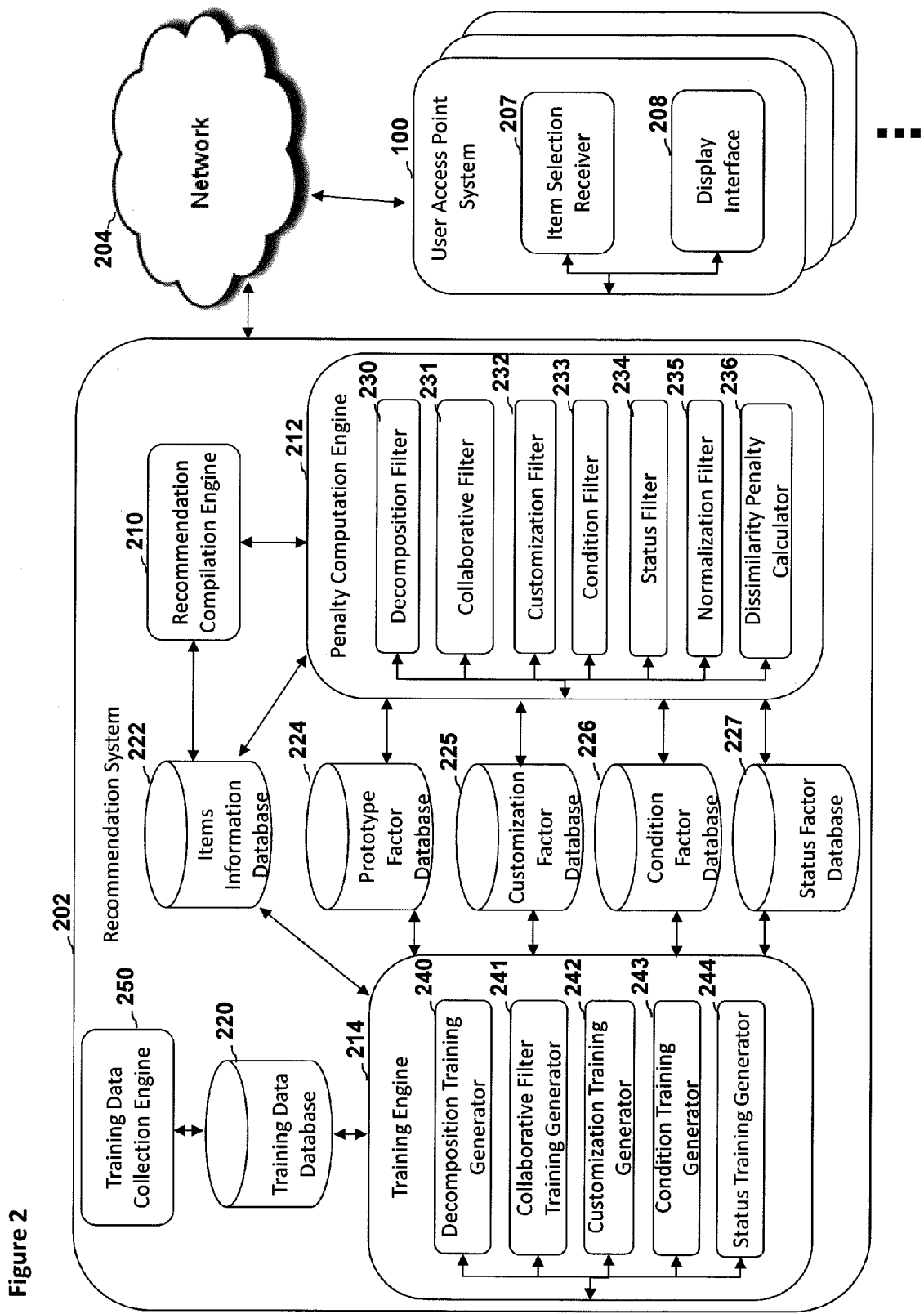
FIG. 2 is a block diagram depicting an embodiment of a recommendation system in communication with one or more user access point systems.

FIG. 2 is a block diagram depicting an embodiment of a recommendation system 202 in communication with one or more user access point systems 100. The recommendation system 202 can be configured to communicate with one or more user access points systems 100 through a network 204. In some embodiments, the recommendation system 202 can be configured to be a data service accessible by one or more user access point systems 100 or other access devices. The network 204 may comprise a local area network, a wide area network, the internet, a cellular phone network, etc. Each user access point system 100 comprises an item selection receiver 207 and a display interface 208. The display interface 208 can be configured to display selected items, alternate items, and other information to a user, such as is shown in FIG. 1. The item selection receiver 207 can be configured to obtain input from a user to, for example, enable a user to select items, select alternate items, filter the alternate items displayed by the display interface 208, and accept various other input selections from a user. In use, a user can select a selected item, such as a used vehicle listing, using a user access point system 100, and information describing or indicating that selected item can be communicated to the recommendation system 202 through the network 204. For example, referring to the user access point system 100 shown in FIG. 1, a user may select as a selected item a 2010. Ford F-150 XL pickup truck. Information describing the selected item can be transferred to the recommendation system 202, to enable the recommendation system 202 to generate a sorted list of recommended alternate items. The recommendation system 202 can be configured to then transmit the sorted list of recommended alternate items back to the user access point system 100 through the network 204 for display to the user using the display interface 208, as shown in FIG. 1.

The recommendation system 202 comprises a recommendation compilation engine 210, a penalty computation engine 212, a training engine 214, and multiple databases. The databases of the recommendation system 202 comprise a training data database 220, an inventory or items information database 222, a prototype factor database 224, a customization factor database 225, a condition factor database 226, and a status factor database 227. The inventory or items information database 222 can be configured to hold or store data related to or describing various items currently on the market for sale. In various embodiments, the items information database 222 can be configured to store data related to a relatively large number of items, such as 1,000, 10,000, 100,000, 1,000,000, or more. For example, the items information database 222 can contain information describing various used vehicles for sale including all relevant information of those items, such as make, model, year, price, condition, marketplace status, etc. In some embodiments, the items information database 222 can be configured to store data related to 18,000,000 or more items. The training database 220 can be configured to contain training data used by the training engine 214 to generate various factors and/or inverse covariance matrices stored in the various factor databases for use by the penalty computation engine 212. The penalty computation engine 212 can be configured to communicate with the various factor databases to compute various penalties and a final dissimilarity penalty for each comparison of a base item or items to a potential alternate item.

The recommendation compilation model 210 can be configured to instruct the penalty computation engine 212 to perform comparisons of a base item or items to a potential alternate item. The recommendation compilation engine 210 can be configured to keep track of the dissimilarity penalty computed by the penalty computation engine 212 of each potential alternate item versus the base item or items. The recommendation compilation engine 210 can instruct the penalty computation engine 212 to perform penalty computations over and over with respect to a single base item or group of base items and various alternate items. Once the penalty computation engine 212 has calculated dissimilarity penalties for a sufficient number of potential alternate items, the recommendation compilation engine 210 can be configured to sort the various potential alternate items based on their respective dissimilarity penalty calculated by the penalty computation engine 212. The recommendation compilation engine 210 can be configured to then send the sorted list of potential alternate items through the network 204 to one or more user access point systems 100 for display to a user or users.

The penalty computation engine 212 comprises various modules for use in computing a dissimilarity penalty. The various modules comprise a decomposition filter 230, a collaborative filter 231, a customization filter 232, a condition filter 233, a status filter 234, a normalization filter 235, and a dissimilarity penalty calculator 236. Some or all of the modules of the penalty computation engine 212 can be configured to perform discreet portions the dissimilarity penalty computation process, as further shown and described in FIG. 4 below.

In operation, the penalty computation engine 212 is configured to receive information describing a base item or group of base items and an alternative item from the recommendation compilation engine 210 and/or items information database 222. The penalty computation engine 212 is configured to then use its various modules to calculate a dissimilarity penalty and send the calculated dissimilarity penalty back to the recommendation compilation engine 210. Some or all of the various modules of the penalty computation engine 212 can be configured to communicate with the various factor databases of the recommendation system 202 to receive factors or inverse covariance matrices used in penalty calculations.

In the embodiment shown in FIG. 2, the decomposition filter 230 is configured to decompose an item, such as a vehicle listing into its prototype, customization, condition, and/or marketplace status. Although the decomposition filter 230 is shown as part of the penalty computation engine 212, in other embodiments, the decomposition filter 230 (or a separate decomposition filter) can be separate from the penalty computation engine 212 and utilized to decompose items prior to calculating dissimilarity penalties and to send the decomposed information to the items information database 222 for later retrieval by the recommendation compilation engine 210 and/or penalty computation engine 212.

The training engine 214 comprises several modules used to generate factors and/or inverse covariance matrices to include in the various factor databases. The training engine 214 comprises a decomposition training generator 240, a collaborative filter training generator 241, a customization training generator 242, a condition training generator 243, and a status training generator 244. The various modules of the training engine 214 can be configured to calculate various factors based on data from the training data database 220 as shown and described in FIG. 7 below.

In some embodiments, the recommendation system 202 can be incorporated into one or more user access point systems 100. In those embodiments, the user makes selections using a user access point system 100, and the user access point system 100 is configured to generate recommendations without having to contact a remote recommendation system over a network. In some embodiments, the recommendation system 202 can be incorporated into the one or more user access point systems 100, but the user access point systems 100 can additionally be configured to access a remote system to update one or more of the recommendation system's various databases or configuration parameters. In some embodiments, modules of the recommendation system 202 are separated into separate systems rather than all being part of the same recommendation system 202. For example, one system can be configured to generate training data and generate data for the various factor databases, while another system can be configured to generate recommendations. In various embodiments, additional systems can be included, for example, to generate data to fill the items information database 222 and/or the training data database 220. In some embodiments, the recommendation system 202 comprises an administration module configured to allow a system administrator to administer various settings of the system, such as to adjust relative weights applied in the normalization filter 235 and to adjust various other configuration settings.

In some embodiments, the recommendation system 202 comprises a training data collection engine 250 configured to collect training data by monitoring user interactions with various listings of unique items. The training data collection engine 250 may, in some embodiments, comprise one or more item listing systems, such as automotive websites. These item listing systems may, for example, list a plurality of used vehicles for sale and allow users of the systems to interact with those listings. Users may, for example, interact with the listings by clicking on certain listings, comparing listings to each other, purchasing an item associated with a listing, expressing interest in one or more listings, and/or the like. The training data collection engine 250 can be configured to collect training data and store the training data in the training data database 220 for use by the training engine 214 to generate the various factors utilized by the penalty computation engine 212. The training data collection engine 250 can be configured to operate, in some embodiments, as shown and described below with reference to FIGS. 7 and 10.

In some embodiments, the training data collection engine 250 operates substantially in real time by logging user interactions with various unique items as the users are interacting with the listings of these unique items. One or more computer systems is necessary for the training data collection process due at least in part to the volume of information required to be collected to enable the training engine 250 to generate useful factors for use by the penalty computation engine 212. A human would not realistically be able to monitor one or more or a multitude of item listing systems substantially in real time, as numerous users are simultaneously interacting with listings of these services. In some embodiments, the training data collection engine 250 may comprise 5, 10, 50, 100 or more item listing services or systems that all need to be monitored substantially in real time and substantially simultaneously. In some embodiments, each of the item listing systems may have 5, 10, 50, 100, 1000 or more users using the listing system substantially simultaneously, adding to the need for at least one computer system to monitor the interactions of users with listings.

In some embodiments, other portions of the recommendation system 202 also operate substantially in real time. For example, when a user of the recommendation system 202 selects an item the user is interested in, such as by using the user access point system 100, the user access point system 100 is configured to send data relating to the selected item to the recommendation system 202 through the network 204. The user of the user access point system 100 will expect a response from the recommendation system 202 in a relatively short amount of time. The user may, for example, expect a recommendation of alternative items from the recommendation system in merely the length of time a webpage takes to load. In some instances, the time available to generate a recommendation based on a selected item may comprise a few seconds or even less time, such as less than one second. Therefore, a recommendation system configured to generate a recommendation based on a selected item requires at least one computer system configured to generate the recommendation substantially in real time. A human would not be able to decompose the selected item and alternative items into their various attributes, calculate various scores for each alternative item, calculate a dissimilarity penalty for each alternative item, sort the alternative items by their respective dissimilarity penalties, and present a recommendation comprising at least some of the alternative items to a user all in a manner of seconds or even less time. Rather, if a human were even able to perform these tasks, the human would spend several orders of magnitude more time on the process, which would be unacceptable to most users of such a system.

Not only is one or more computer systems and/or computer hardware required to operate the training data collection engine 250 and/or other portions of the recommendation system 202 to allow the system to operate at an acceptable speed, but a human would not even be able to perform at least some of the operations performed by the recommendation system 202. For example, the training data collection engine 250 in some embodiments requires simultaneous monitoring of multiple item listing services generating websites for display to a multitude of users. A human being would not be able to realistically monitor all of these interactions without the assistance of a computer system. With respect to other portions of the recommendation system 202, various calculations take place that would be extremely complex for a human to do without the assistance of a computer system. Some examples are the Mahalanobis distance calculations, covariance matrix calculations, regression calculations, and various other complex calculations required in some embodiments by the recommendation system 202.

Additionally, when generating a recommendation, a multitude of variables must be tracked for each alternative item, and in some embodiments a relatively large number of alternative items is considered. For example, the recommendation compilation engine 210 may take into account 10, 50, 100, 1000, 10,000, or more alternative items in the calculation of one recommendation to present to a user. In addition to the amount of time it would take a human to perform such calculations, it would be difficult, if not impossible, for a human to keep track of all of the variables and calculated items required to be calculated for each of the alternative items when generating a single recommendation. Additionally, even if only a few alternative items were being considered, the various factors, such as prototype, customization, condition, and status factors used to calculate dissimilarity penalties must also be managed. A human would not be able to realistically manage each of these plurality of factors in addition to calculating the various scores and dissimilarity penalties. Therefore, it can be seen that the operation of a recommendation system as described herein necessitates the use of computer hardware and/or at least one computer system.

Figure 3:
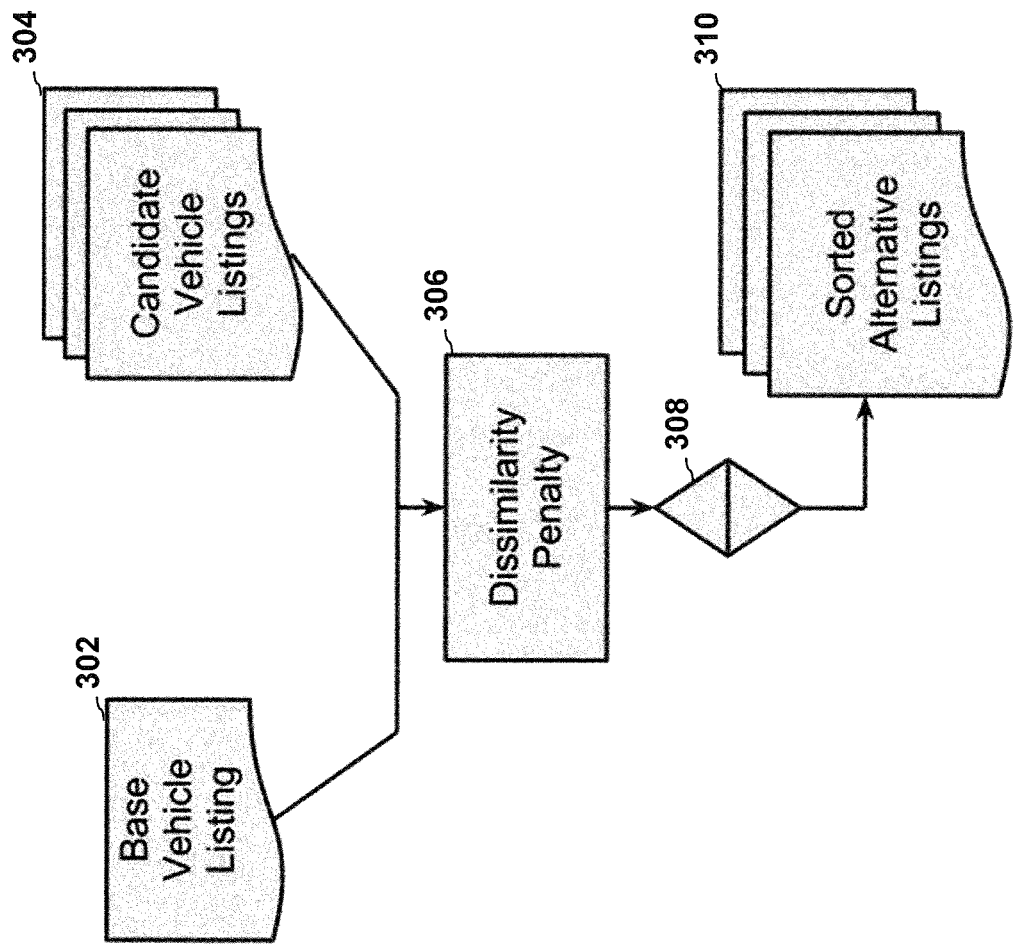
FIG. 3 depicts an embodiment of a process flow diagram illustrating an example of selecting alternative items from a candidate set for recommendation to a user.

FIG. 3 depicts an embodiment of a process flow diagram illustrating an example of selecting alternative items from a candidate set for recommendation to a user. This process can be performed, for example, by the recommendation system 202 shown in FIG. 2. At block 302 a base vehicle listing is provided. The base vehicle listing may be, for example, an item selected by a user using a user access point system 100, such as the selected item 102 shown in FIG. 1. In some embodiments, a group of more than one base vehicle listings is provided at block 302. The group may, for example, indicate more than one vehicle listing a user has expressed an interest in. At block 304 a set of candidate vehicle listings is provided. The candidate vehicle listings 304 may be provided, for example, by the items information database 222 of the recommendation system 202 to the recommendation compilation engine 210 and/or to the penalty computation engine 212 of the recommendation system 202 shown in FIG. 2. In some embodiments, the candidate vehicle listings comprise an entirety of the vehicle listings included in, for example, the items information database 222. In some embodiments, the candidate vehicle listings comprise a subset of vehicle listings included in, for example, the items information database 222. The subset of listings can be of a certain predetermined number of listings. The subset of listings can, in some embodiments, be produced by pre-filtering the listings in, for example, the items information database 222, to choose only candidate vehicle listings that are likely to have a relatively low dissimilarity penalty with respect to the base vehicle listing. For example, the pre-filtering process can be configured to only supply or provide candidate vehicle listings having a similar body styles to the base vehicle listing, having a model year within a predetermined range of the year of the base vehicle listing, being offered for sale within a predetermined geographic range of the base vehicle listing, etc.

At block 306 a dissimilarity penalty is calculated for each candidate of the candidate vehicle listings as compared to the base vehicle listing. For example, the recommendation compilation engine 210 of the recommendation system 202 can be configured to instruct the penalty computation engine 212 to calculate a dissimilarity penalty of the base vehicle listing versus an individual candidate vehicle listing. The recommendation compilation engine 210 can be configured to instruct the penalty computation engine 212 to repeat this process for each candidate vehicle in the candidate vehicle listings. In some embodiments, the candidate vehicle listings comprise 10, 100, 1000, 10,000 or more candidate vehicle listings. In some embodiments, the process performed at block 306 is performed substantially in real time.

At block 308 the candidate vehicle listings are sorted based on their respective dissimilarity penalties. For example, the recommendation compilation engine 210 of the recommendation system 202 can be configured to sort the candidate vehicles in the candidate vehicle listings based on the dissimilarity penalties calculated by the penalty computation engine 212. In some embodiments, the system can also be configured to eliminate certain candidate vehicle listings from the overall set of candidate vehicle listings at block 308. For example, if a candidate vehicle listing has a dissimilarity penalty exceeding a certain value or relative value, that listing may be eliminated. In another example, the system is configured to only include a predetermined number of candidate vehicle listings, such as five or ten, and only that number of listings having the lowest dissimilarity penalties are retained, with the remaining listings being discarded. At block 310 the sorted listing of the candidate or alternate vehicle listings is provided to a user. For example, the sorted list can be sent from the recommendation system 202 through the network 204 to one or more user access point systems 100 for viewing by the user.

Figure 4:
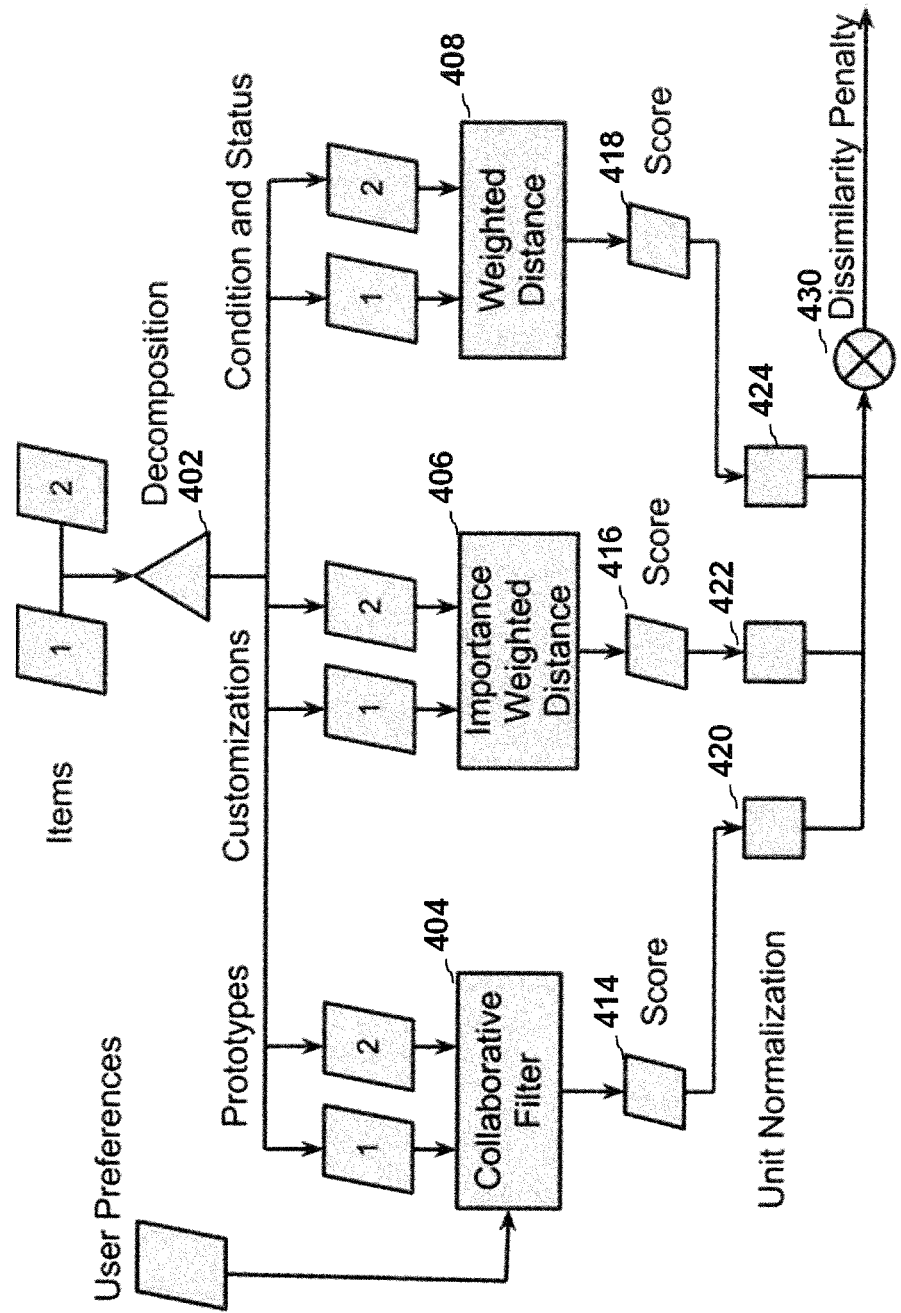
FIG. 4 depicts an embodiment of a process flow diagram illustrating an example of computing a dissimilarity penalty for two items.

FIG. 4 depicts an embodiment of a process flow diagram illustrating an example of computing a dissimilarity penalty for two items. The two items may be, for example a base vehicle listing (i.e. item 1), and a candidate vehicle listing (i.e. item 2). This process may take place, for example, during block 306 of the process flow diagram shown in FIG. 3. At block 402 items 1 and 2 are decomposed into their respective prototype, customization, and condition. The decomposition may be performed, for example, as shown and described below in FIG. 5. The condition of each item may additionally include the marketplace status of the item. In alternate embodiments, the items are decomposed into four separate categories: a prototype, a customization, a condition, and a status. In some embodiments, decomposition of items takes place in a separate process prior to the dissimilarity penalty calculation process. In those embodiments, the process flow diagram shown in FIG. 4 may be configured to skip block 402.

At block 404 a collaborative filter receives a user's preferences and compares the prototypes of items 1 and 2 to generate a score indicating the probability that a user will be interested in item 2. This process may be performed by, for example, the collaborative filter 231 of the recommendation system 202 shown in FIG. 2. The collaborative filter 231 may be configured to utilize factors stored in the prototype factor database 224 in calculating this probability. In some embodiments, the factors are generated using co-occurrence data calculated by, for example, the training engine 214. In some embodiments, the user's preferences may include, for example, a history of other prototypes the user has been exposed to. The preferences may also include, for example, filters that the user has applied. For example, a user may have indicated that the user is only interested in a certain make and model, a certain price range, etc. In some embodiments, the collaborative filter does not take into account user preferences, and instead only calculates the probability using factors in the prototype factor database 224. At block 414 the probability or score is output from the collaborative filter.

At block 406 a customization penalty or score is calculated based on a model that predicts the preference impact of different customization options of the two items or vehicles. In some embodiments, the predicted preference impact is a predicted price impact. In other embodiments, the predicted preference impact may be a predicted impact on additional and/or other criterion or attributes that may affect a user's preference of one item over another. As described above, the penalty can be calculated, for example, as the Mahalanobis distance from the origin for a single vector with nonzero elements that contains the price impacts of options present on one vehicle but not the other vehicle. This penalty or score is output as a score at block 416. The process performed at block 406 can be performed by, for example, the customization filter 232 of the recommendation system 202 shown in FIG. 2. The customization filter 232 can be configured to utilize factors or inverse covariance matrices stored in the customization factor database 225 in calculating the penalty or score.

At block 408 a condition and status penalty for the pair of vehicles is computed, as described above, as the Mahalanobis distance between vectors describing condition and/or market attributes such as year, mileage, price, geographic location, etc., for items 1 and 2. This condition penalty is output as a score at block 418. The process performed at block 408 can be performed by, for example, the condition filter 233 and/or the status filter 234 of the recommendation system 202 shown in FIG. 2. The condition filter 233 can be configured to utilize factors or inverse covariance matrices stored in the condition factor database 226 in calculating the penalty or score. The status filter 234 can be configured to utilize factors or inverse covariance matrices stored in the status factor database 227 in calculating the penalty or score.

At blocks 420, 422, and 424, one or more of the various penalties or scores output from the prototype, customization, and condition and/or status calculations are normalized prior to being combined. The normalization can be performed by, for example, the normalization filter 235 of the recommendation system 202 shown in FIG. 2. In some embodiments, the normalization process comprises converting a penalty or score to a squared Mahalanobis distance. This process may be desirable, because, when the penalties or scores are statistically independent, the sum of their respective squared Mahalanobis distances is equal to the Mahalanobis distance between the full objects. In other embodiments, a penalty or score may be normalized in various other ways. For example, the normalization process may comprise converting a penalty or score to a probability or a log(probability). In some embodiments, the normalization process utilizes a factor or factors that can be calculated by, for example, the training engine 214 of the recommendation system 202 by analyzing the effect of various prototypes, customizations, conditions, and/or statuses on user interests. In some embodiments, the factor or factors may comprise, for example, inverse covariance matrices. In some embodiments, the normalization factor or factors can be set or overridden manually by an administrator of, for example, the recommendation system 202, to apply a desired weight to each penalty or score.

At block 430 the three scores or penalties are combined producing a final dissimilarity penalty for item 2 as compared to item 1. The dissimilarity penalty may be calculated by, for example, the dissimilarity penalty calculator 236 of the recommendation system 202 shown in FIG. 2. In some embodiments, the dissimilarity penalty is calculated as a simple addition of the input scores or penalties. In some embodiments, the input scores or penalties are weighted by a predetermined factor or factors prior to being added together. In some embodiments, the scores or penalties are combined by multiplication. This method may be desirable, for example, when the scores or penalties have been converted to probabilities. In some embodiments, a flag or indicator is set to disregard a certain item if, for example, the dissimilarity penalty exceeds a certain threshold. The calculated dissimilarity penalty may, for example, be sent to the recommendation compilation engine 210 shown in FIG. 2 to allow the recommendation compilation engine 210 to generate a sorted list of candidate listings or items, sorted by their respective dissimilarity penalties.

Figure 5:
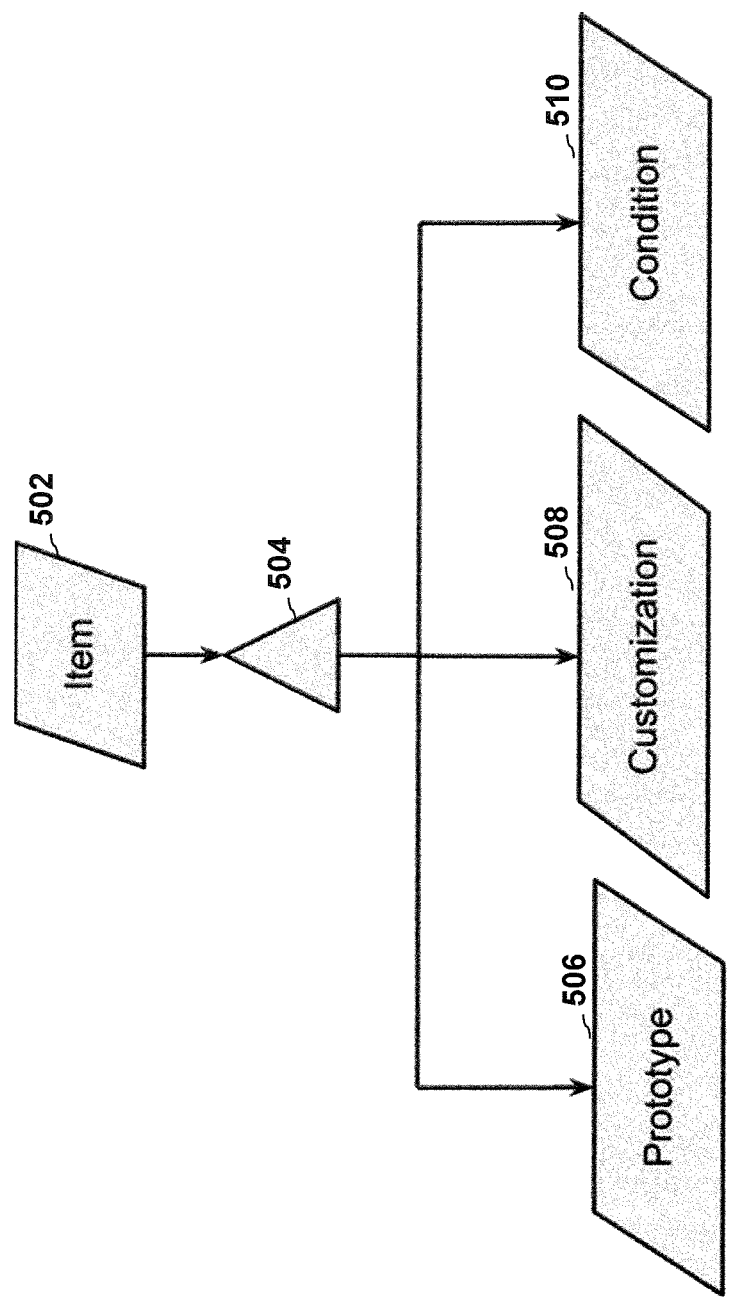
FIG. 5 depicts an embodiment of a process flow diagram illustrating an example of decomposing an item into a prototype, customization, and condition.

FIG. 5 depicts an embodiment of a process flow diagram illustrating an example of decomposing an item into a prototype, customization, and condition. At block 502 information describing an item is provided. For example, a vehicle listing is provided. At block 504 the item is decomposed into its prototype, customization, and condition. The decomposition may be performed by, for example, the decomposition filter 230 shown in FIG. 2. In some embodiments, the decomposition may be performed by a different decomposition filter separate from the recommendation module 212 shown in FIG. 2. For example, the decomposition may be performed as a part of a process to fill the items information database 222 of the recommendation system 202 with information describing various vehicle listings. At blocks 506, 508, and 510, the item's prototype, customization, and condition are output. In some embodiments, this information may be output to, for example, the items information database 222 shown in FIG. 2. In some embodiments, this information may be utilized as a part of, for example, the process flow diagram shown in FIG. 4.

FIG. 6 depicts an example of some portions of a dissimilarity penalty calculation. The example calculation is split into three separate calculations or sections: 602, 604, and 606, representative of the calculations beginning at blocks 404, 406, and 408 of the process flow diagram of FIG. 4. Section 602 illustrates an example of the collaborative filter process shown at blocks 404, 414, and 420 of FIG. 4. In this example, the base vehicle, or item 1, is a Ford F-150 pickup. Candidate 1, or item 2, is a Chevrolet Silverado 1500 pickup. This make, model, and body style information forms the prototypes of the base vehicle, or item 1, and candidate 1, or item 2. As shown in FIG. 6, the collaborative filter process generates a normalized penalty or score of 8.90 between this base vehicle and candidate 1. The normalized score of 8.90 is the squared Mahalanobis distance of 14.8%, which is the output of the process performed at block 404 of FIG. 4 (not shown in FIG. 6). Section 602 also illustrates the output of a second collaborative filtering process between the base vehicle and a second candidate, candidate 2. In this example, candidate 2 is a GMC Sierra 1500 pickup. The collaborative filter process in this example computes a normalized penalty or score of 16.00 between the base vehicle and candidate 2. The normalized score of 16.00 is the squared Mahalanobis distance of 7.2%, which is the output of the process performed at block 404 of FIG. 4 (not shown in FIG. 6).

Section 604 illustrates an example of calculating customization penalties between a base vehicle and a first candidate and a second candidate. This is an example of the calculations performed at blocks 406, 416, and 422 of FIG. 4. In this example, four potential customizations are considered. However, in other embodiments, any number of potential customizations can be considered. The potential customizations are whether the vehicle has an 8 cylinder engine, whether the vehicle has keyless entry, whether the vehicle is a flexible fuel vehicle, and whether the vehicle has four wheel drive. In comparing the base vehicle to candidate 1, no penalty is applied for the engine type or entry type because both the base vehicle and candidate 1 have an 8 cylinder engine and keyless entry. However, a penalty is applied for the fuel type customization, because candidate 1 has the flexible fuel option and the base vehicle does not. In this embodiment, the penalty is based on the estimated price difference between a vehicle that has that option and a vehicle that does not have that option. However, in other embodiments, the penalty may be based on additional or other criterion or attributes that may affect a user's preference for one item as compared to another item. In this example, it is estimated that the price difference for the flexible fuel option is $179. Neither the base vehicle nor candidate 1 have a four wheel drive option, therefore there is no penalty for this option. The various penalties are summed and then normalized by computing a squared Mahalanobis distance, as described above. Therefore, in comparing the base vehicle to candidate 1, the total normalized customization penalty for candidate 1 is 0.03. In other embodiments, the customization penalty can be calculated various other ways, as long as the penalty is at least partially an indication of how similar or dissimilar the base and candidate vehicle are.

When performing the customization penalty calculation a second time for the base vehicle versus candidate 2, the penalty comes out differently. In this case, both vehicles have an 8 cylinder engine, so there is no penalty for that option. However, the base vehicle has keyless entry, which candidate 2 does not. The price difference for the keyless entry option is estimated to be $295. Neither of these vehicles has the flexible fuel option, so there is no penalty for that option. Candidate 2 does have the four wheel drive option that the base vehicle does not have. Therefore, an estimated $3,154 price difference is indicated. In this case, the total estimated price difference is $3,449, leading to a normalized customization penalty of 11.90.

Although the customization penalty in this embodiment is proportional to the estimated value of each customization option, various other embodiments may calculate the penalty in various other manners. In some embodiments, the training engine 214 of the recommendation system 202 may additionally include one or more modules configured to analyze data from the training data database 220 to determine the estimated values of various customization options. These estimated values may then be used during the customization penalty calculation process by, for example, the customization filter 232.

Section 606 illustrates an example of calculating a condition penalty comparing a base vehicle to a first and a second candidate. In this example, the base vehicle is a 2010 model year with 46,006 miles and is listed for a price of $24,995.00. Candidate 1 is a 2012 model year, two years newer than the base vehicle, which generates a normalized penalty of 1.83. Candidate 1 has less mileage than the base vehicle, which generates a normalized penalty of 0.77. Candidate 1 is listed for the same price as the base vehicle, therefore there is no penalty. The total penalty is calculated by adding the various individual penalties. In this case, the total normalized condition penalty is 2.60. Although in this example the condition penalty calculation takes into account three criterion or attributes that may affect a user's preference for one item as compared to another item, namely year, mileage, and price, in other embodiments, the condition penalty calculation process may take into account more, less, or different criterion or attributes.

For candidate 2 versus the base vehicle, candidate 2 is a model year 2007, creating a normalized penalty of 4.11. The mileage and price differences generate normalized penalties of 4.77 and 5.41, respectively. Therefore, the total normalized condition penalty for candidate 2 is 14.29. The various penalty values calculated in section 606 can be calculated, for example, as squared Mahalanobis distances, as described above.

At section 608 the final dissimilarity penalty is calculated for each candidate item. For candidate 1, the dissimilarity penalty is calculated as 11.53, which is the sum of the penalties from the prototype, customization, and condition penalties. Similarly, the dissimilarity penalty for candidate 2 is calculated as 42.19. Therefore, in this case, if both candidates 1 and 2 were to be displayed to a user as potential alternates to the base vehicle, candidate 1, having the lower dissimilarity penalty, would displayed prior to candidate 2 in a list sorted on the dissimilarity penalties. Although not shown in FIG. 6, some embodiments may include an additional step of weighting one or more of the outputs of sections 602, 604, and/or 606 prior to summing them, if, for example, it is desired to apply more or less weight to one or more of the individual penalties.

Figure 7:
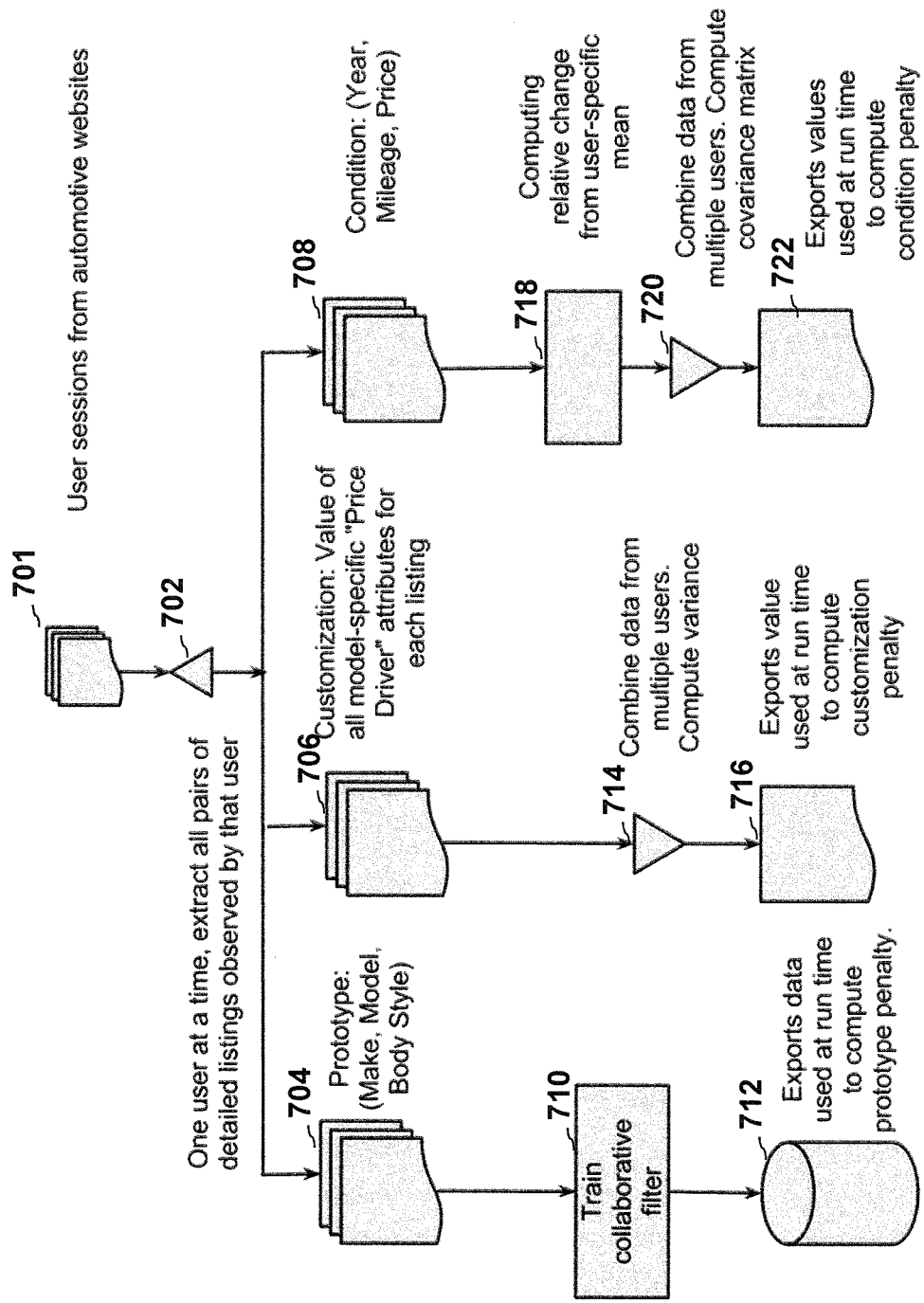
FIG. 7 depicts an embodiment of a process flow diagram illustrating an example of a training process.

FIG. 7 depicts an embodiment of a process flow diagram illustrating an example of a training process. At block 701, user sessions from automotive websites are provided. User sessions may be provided, for example, as logs of user behavior from various websites that display cars for sale to consumers. The user sessions may be stored in and provided by, for example, the training data database 220 of the recommendation system 202 of FIG. 2. At block 702, for each user represented in the user sessions provided at block 701, the process extracts all pairs of detailed listing observed by that user. The process then decomposes each pair of detailed listings into its prototype, customization, and condition, as described above with reference to FIGS. 4 and 5. In some embodiments, the listings may also be decomposed into a marketplace status. In some embodiments, the marketplace status is combined with the condition of the listing. The decomposition process may be performed by, for example, the decomposition training generator 240 of the training engine 214 shown in FIG. 2.

At block 704 the various prototypes viewed by a user are provided. At block 710 a collaborative filter is trained. For example, the process reviews the various pairs of prototypes observed by a user and generates training vectors or factors to be stored at block 712 in, for example, the prototype factor database 224 shown in FIG. 2. The collaborative filter training process can be implemented using various collaborative filtering algorithms.

At block 706 the various customizations of the vehicle listings observed by the user are provided. In embodiments that utilize an estimated price impact as the criteria or as one of multiple criterion for estimating a preference impact of various condition attributes, the process may additionally provide estimated values of all model specific price driver attributes for each listing (i.e. the value of each individual customization option, as discussed above with reference to FIG. 6). For example, the values shown in section 604 of FIG. 6 may be provided at block 706. At block 714 data from multiple users is combined to compute a covariance matrix which, at block 16 is stored in a customization factor database, such as the customization factor database 225 shown in FIG. 2. The covariance matrices can be computed by, for example, the customization training generator 242 shown in FIG. 2. The computation process can include, for example, Mahalanobis distance calculations, linear regressions, nonlinear regressions, nearest neighbor analyses, and/or the like.

At block 708 various condition factors of the listings observed by the users are provided. For example, the year, mileage, price, etc., of the listings observed by the users are provided. At block 718 the process computes a relative change from a user-specific mean for the various condition factors. At block 720 the data from multiple users is combined and a covariance matrix is produced. The process at blocks 718 and 720 can be performed by, for example, the condition training generator 243 shown in FIG. 2, and can include, for example, Mahalanobis distance calculations, linear regressions, nonlinear regressions, nearest neighbor analyses, and/or the like. At block 722 the covariance matrix is exported to, for example, the condition factor database 226 and/or the status factor database 227 shown in FIG. 2. The covariance matrix or matrices can then be used at run time by, for example, the penalty computation engine 212 shown in FIG. 2.

Figure 8:
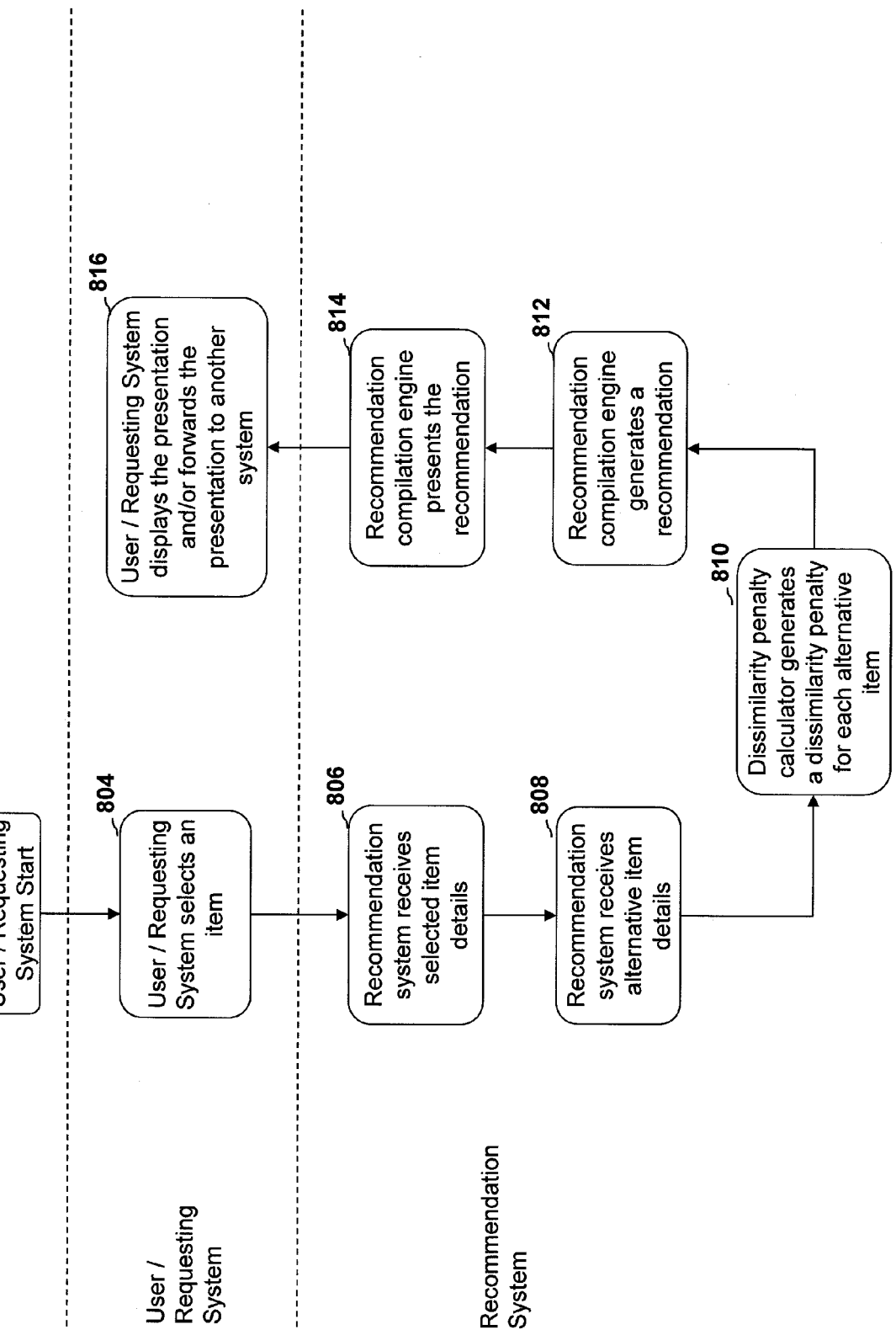
FIG. 8 depicts an embodiment of a process flow diagram illustrating an example of generating a recommendation of alternative items.

FIG. 8 depicts an embodiment of a process flow diagram illustrating an example of generating a recommendation of alternative items. The process flow illustrated in FIG. 8 may be performed by, for example, the recommendation system 202 and user access point system 100 shown in FIG. 2. At block 802 a user and/or requesting system starts the process. For example, a user using a user access point system 100 may start the process. In some embodiments, a requesting system separate from a user access point system may start the process. At block 804 the user and/or requesting system selects an item. For example, a user may select an item using the item selection receiver 207 of the user access point system 100.

At block 806 the recommendation system receives details of the selected item. For example, the recommendation system 202 may receive details of various attributes of the item selected at block 804. At block 808 the recommendation system receives alternative item details. For example, the recommendation system may receive details of various attributes of a plurality of alternative items. The attributes received at blocks 806 and 808 may comprise, for example, attributes defining items' prototype, customization, condition, and/or status attributes.

At block 810 a dissimilarity penalty calculator generates a dissimilarity penalty for each alternative item. In some embodiments, the dissimilarity penalty calculator generates the dissimilarity penalties as shown and described with reference to FIG. 4 and/or FIG. 9. At block 812 a recommendation compilation engine generates a recommendation. For example, a recommendation compilation engine may be configured to sort the plurality of alternative items based on each item's dissimilarity penalty. The recommendation may, for example, comprise the list of alternative items sorted in ascending order based on each item's dissimilarity penalty.

At block 814, the recommendation compilation engine presents the recommendation. For example, the recommendation compilation engine may transmit data representing the recommendation through a network. At block 816, the user and/or requesting system displays the presentation and/or forwards the presentation to another system. For example, the display interface 208 of the user access point system 100 may display the recommendation to a user using an electronic display. In another example, a requesting system transfers the presentation to another system through a network to allow the another system to present or otherwise utilize the recommendation.

Figure 9:
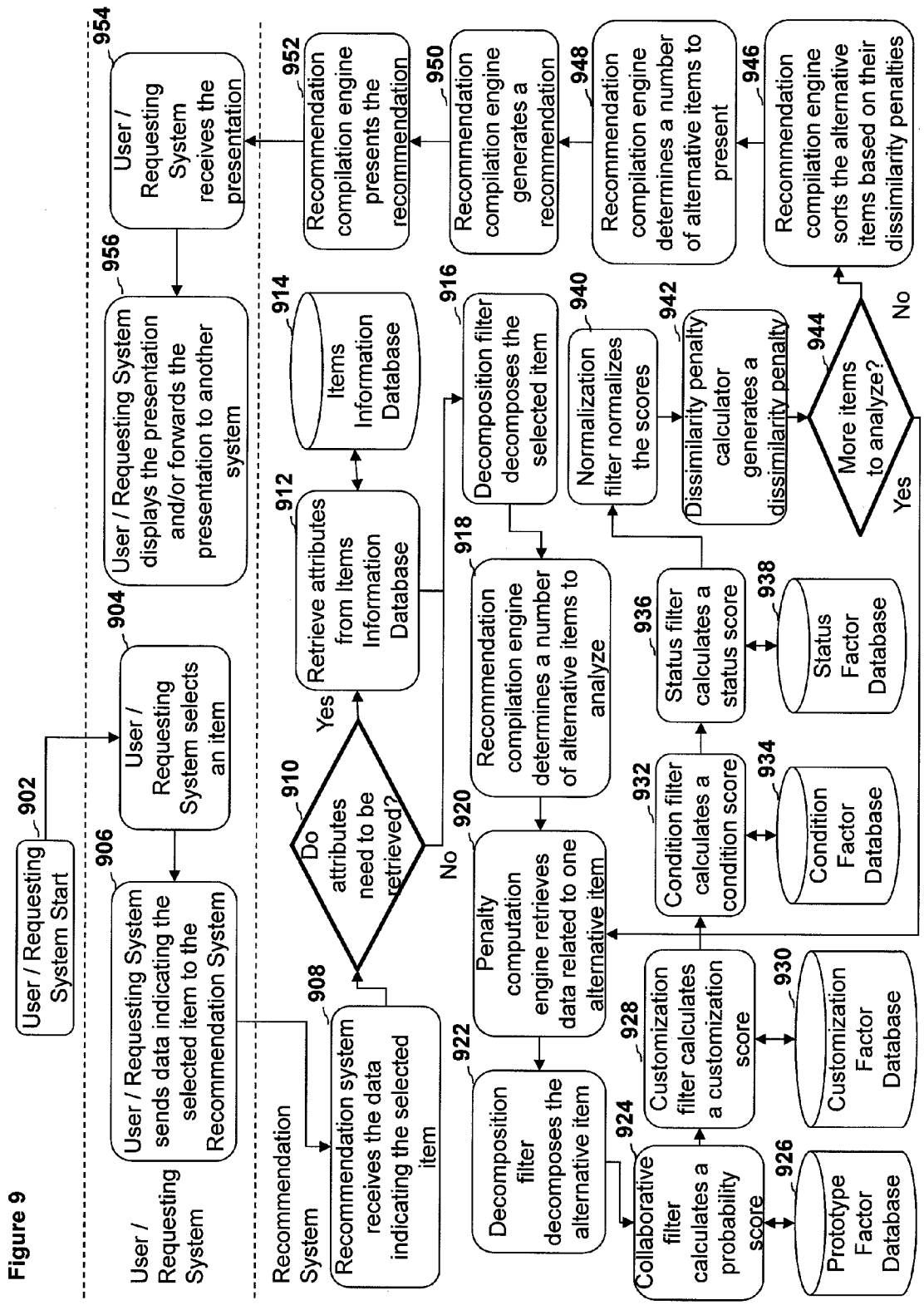
FIG. 9 depicts an embodiment of a process flow diagram illustrating an example of generating a recommendation of alternative items based on a selected item.

FIG. 9 depicts an embodiment of a process flow diagram illustrating an example of generating a recommendation of alternative items based on a selected item. The process flow shown in FIG. 9 may be performed by, for example, the recommendation system 202 and user access point system 100 shown in FIG. 2. At block 902 a user and/or requesting system starts the process. At block 904 the user and/or requesting system selects an item. For example, a user using the user access point system 100 may indicate a selection of a particular used vehicle the user is interested in using the item selection receiver 207. At block 906, the user and/or requesting system sends data indicating the selected item to the recommendation system.

At block 908 the recommendation system receives the data indicating the selected item. The recommendation system may, for example, receive the data indicating the selected item through a network. At block 910, the recommendation system determines whether attributes of the selected item need to be retrieved. For example, the selected item may have prototype, customization, condition, and/or status attributes. In some embodiments, the user and/or requesting system may include these various attributes in the data sent to the recommendation system. In that case, additional attributes may not need to be retrieved by the recommendation system. In other embodiments, the user and/or requesting system may send a unique identifier to the recommendation system, wherein the unique identifier identifies the selected item. In that case, the process moves to block 912 and retrieves the attributes from an items information database shown at block 914. The recommendation system can, for example, utilize the unique identifier to retrieve attribute data related to the selected item, the attribute data being stored in the items information database and linked to the unique identifier.

If attributes do not need to be retrieved, or once the attributes have been retrieved, the process moves to block 916. At block 916 a decomposition filter decomposes the selected item. This may be performed by, for example, the decomposition filter 230 shown in FIG. 2. Decomposing the selected item may be performed as shown and described above with reference to FIG. 5, where an item is decomposed into its specific prototype, customization, condition, and/or status attributes. In some embodiments, the attribute data retrieved at block 912 and/or received from the user and/or requesting system is already decomposed, and the process at block 916 is not necessary.

At block 918 the recommendation compilation engine determines a number of alternative items to analyze. The number of alternative items may be defined by, for example, a variable set by an administrator. In other embodiments, the number of alternative items to analyze may depend on the number of alternative items available for analysis in the items information database or on data received from the user and/or requesting system. In some embodiments, the recommendation system determines to analyze every alternative item in the items information database. In other embodiments, the system determines to analyze only a subset of items in the items information database.

At block 920 a penalty computation engine retrieves data related to one alternative item. This block may be performed by, for example, the penalty computation engine 212 shown in FIG. 2. The penalty computation engine may, for example, retrieve data related to the one alternative item from the items information database. At block 922 the decomposition filter decomposes the alternative item. For example, the decomposition filter decomposes the alternative item as shown in FIG. 5 into its prototype, customization, condition, and/or status attributes.

At blocks 924 through 942, the recommendation system calculates a dissimilarity penalty for the one alternative item. At block 924, a collaborative filter calculates a probability score. The probability score may be calculated as described above with reference to FIG. 4. The collaborative filter may utilize prototype factors from the prototype factor database shown at block 926 in the calculation of the probability score. At block 928 a customization filter calculates a customization score for the alternative item. The customization filter may calculate the customization score as shown and described with reference to FIG. 4 above. In calculating the customization score, the customization filter may utilize customization factors from the customization factor database shown at block 930.

At block 932, a condition filter calculates a condition score for the alternative item. The condition score may be calculated as shown and described above with reference to FIG. 4. In calculating the condition score, the condition filter may utilize condition factors from the condition factor database shown at block 934. At block 936, a status filter calculates a status score for the alternative item. The status score may be calculated as shown and described with reference to FIG. 4 above. In calculating the status score, the status filter may take into account status factors from the status factor database shown at block 938.

At block 940 a normalization filter normalizes the various scores. Although, in this embodiment, the normalization of the four scores takes place after all the scores have been calculated, in some embodiments, normalization of one or more of the scores is a part of the process of calculating that score. In those embodiments, one or more scores do not need to be normalized at block 940, because they were already normalized during their calculation. At block 942, a dissimilarity penalty calculator generates a dissimilarity penalty. The dissimilarity penalty may be calculated based on the various scores as shown and described with reference to FIG. 4 above.

At block 944, the recommendation system determines whether there are more alternative items to analyze. If there are more alternative items to analyze, the process moves back to block 920 and proceeds as previously described. Once all of the alternative items have been analyzed, the process flow moves from block 944 to block 946. At block 946, the recommendation compilation engine sorts the alternative items based on their dissimilarity penalties. In some embodiments, the recommendation compilation engine sorts the alternative items in ascending order based on the dissimilarity penalties. At block 948, the recommendation compilation engine determines a number of alternative items to present. In some embodiments, an administrator of the recommendation system may pre-determine the number of alternative items to present in the recommendation. In other embodiments, the number of alternative items to present may be determined by information transmitted to the recommendation system from the user and/or requesting system.

At block 950, the recommendation compilation engine generates a recommendation. The recommendation may comprise, for example, the first ten alternative items in the sorted alternative item list, if the determined number of alternative items to present was ten. At block 952, the recommendation compilation engine presents the recommendation. For example, the recommendation compilation engine may transmit data representing the recommendation through a network to the user and/or requesting system. At block 954 the user and/or requesting system receives the presentation from the recommendation system. At block 956, the user and/or requesting system displays the presentation and/or forwards the presentation to another system. For example, the user access point system 100 may utilize the display interface 208 to display the presented recommendation to a user on an electronic display. In another example, the system may forward the presentation on to another system for that system's use.

Figure 10:
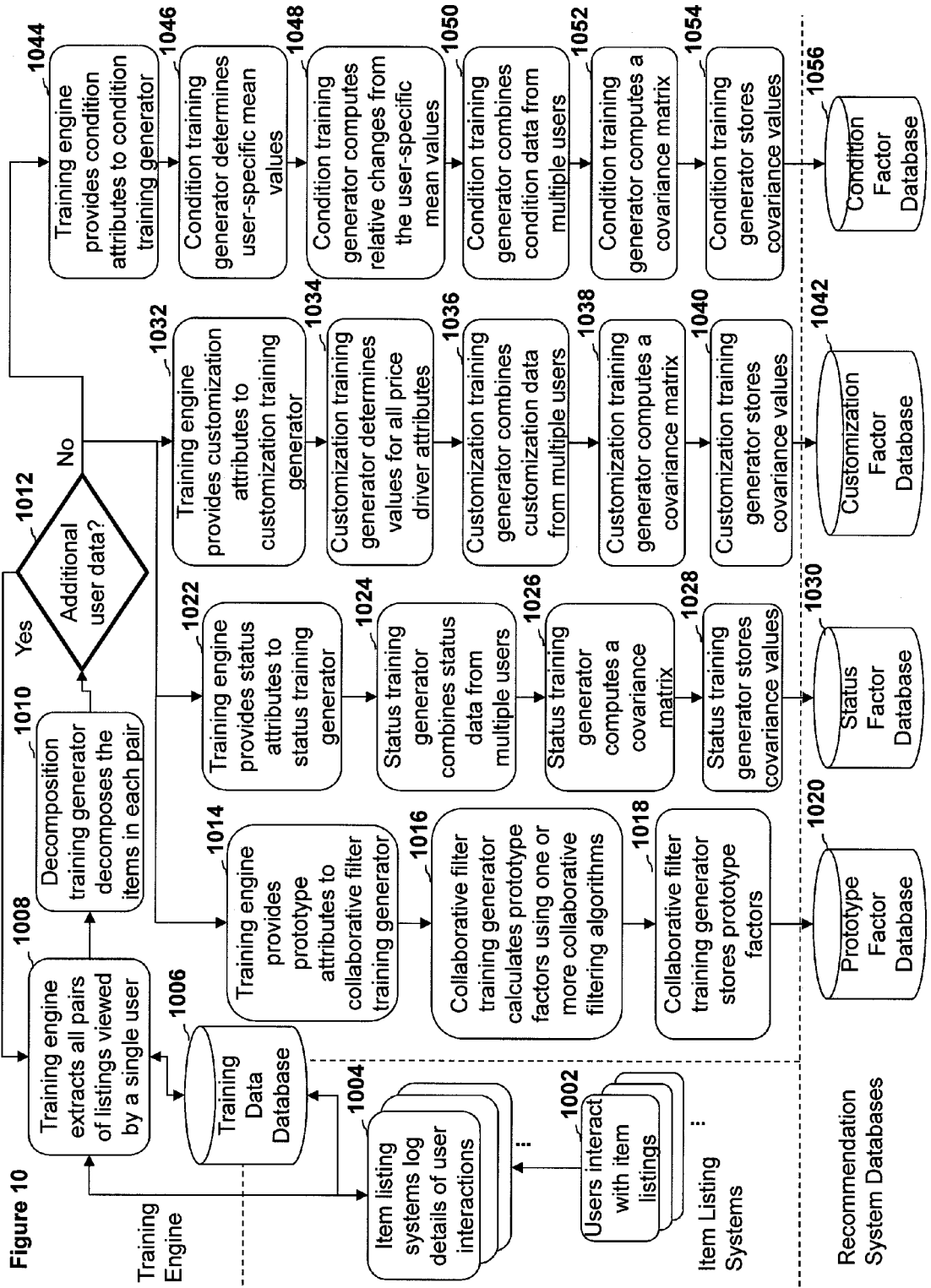
FIG. 10 depicts an embodiment of a process flow diagram illustrating an example of a training process.

FIG. 10 depicts an embodiment of a process flow diagram illustrating an example of a training process. The process flow depicted in FIG. 10 may be performed by, for example, the recommendation system 202 shown in FIG. 2. At block 1002, users interact with item listings. For example, users may interact with listings of used vehicles provided by item listing systems and/or the training data collection engine 250 shown in FIG. 2. Users may interact with listings, as further described above, for example, by clicking on listings, comparing one listing to another listing, indicating an interest in one or more listings, purchasing items associated with one or more listings, and/or the like. The users interacting with item listings may comprise interacting with one item listing system or a plurality of item listing systems. In some embodiments, users interact with a multitude of item listing systems, such as 5, 10, 50, 100, or more. At block 1004, the item listing systems log details of the user interactions. The details of these user interactions may be stored, for example, in the training data database of the recommendation system as shown in block 1006. In some embodiments, the item listing systems log these details substantially in real time as the users are interacting with the one or more or multitude of item listing systems.

At block 1008, a training engine extracts all pairs of listings viewed by a single user. For example, the training engine 214 shown in FIG. 2 may access the training data database and the details of user interactions stored therein. A pair of listings may comprise, for example, two vehicles that a user compared or viewed at substantially the same time. At block 1010, a decomposition training generator decomposes the items in each pair. The decomposition training generator may decompose the items as shown and described above with reference to FIG. 5. The decomposition may comprise decomposing the attributes of each item into prototype, customization, condition, and/or status attributes.

At block 1012, the training engine determines whether there is data for additional users. If there is additional user data, the process flow moves back to block 1008 and extracts all pairs of listings viewed by the next user. This process continues until there are no additional users to extract data relating to. Once there is no additional user data, the process moves from block 1012 to blocks 1014, 1022, 1032, and/or 1044.

Beginning at blocks 1014, 1022, 1032, and 1044, the training engine generates factors for use in computing dissimilarity penalties as further described above with reference to FIGS. 4 and 9. At block 1014, the training engine provides prototype attributes to a collaborative filter training generator. For example, the training engine provides prototype attributes that were determined during decomposition at block 1010. At block 1016, the collaborative filter training generator populates prototype factors using one or more collaborative filtering algorithms. The prototype factors can be calculated as described above with reference to FIG. 4. At block 1018, the collaborative filter training generator stores the prototype factors for use by, for example, the penalty computation engine shown in FIG. 2. The prototype factors may be stored in, for example, the prototype factor database shown at block 1020.

At block 1022, the training engine provides status attributes to a status training generator. The status attributes may be, for example, status attributes determined during the decomposition at block 1010. At block 1024, the status training generator combines status data from multiple users. At block 1026, the status training generator computes a covariance matrix based on the combined status data from multiple users, as further described above with reference to FIG. 4. At block 1028, the status training generator stores the covariance values for use by the penalty computation engine. The covariance values may be stored in, for example, the status factor database shown at block 1030.

At block 1032, the training engine provides customization attributes to a customization training generator. The customization attributes may be, for example, the customization attributes determined during the decomposition at block 1010. At block 1034, the customization training generator determines values for all price driver attributes. These values may be determined, for example, as described above with reference to FIG. 4. Although in this embodiment the process flow includes determining an estimated value for price driver attributes in creating customization factors, in other embodiments, the process flow may include additional and/or different criterion that may affect a user's preference for an item as compared to another item. At block 1036, the customization training generator combines customization data from multiple users. At block 1038, the customization training generator computes a covariance matrix based on the data from multiple users, as described above with reference to FIG. 4. At block 1040, the customization training generator stores the covariance values in, for example, the customization factor database shown at block 1042.

At block 1044, the training engine provides condition attributes to a condition training generator. These condition attributes may be, for example, the condition attributes determined during the decomposition at block 1010. At block 1046, the condition training generator determines user specific mean values of the various condition attributes. The user specific mean values may be populated in real time and/or retrieved from a database of user specific mean values. At block 1048, the condition training generator computes a relative changes from the user specific mean values. For example, the condition training generator computes variations of the condition attributes provided at block 1044 to the user specific mean values determined at block 1046. At block 1050, the condition training generator combines condition data from multiple users. At block 1052, the condition training generator computes a covariance matrix based on the condition data from multiple users. At block 1054, the condition training generator stores the covariance values from the covariance matrix in, for example, a condition factor database shown at block 1056.

Computing System

Figure 11:
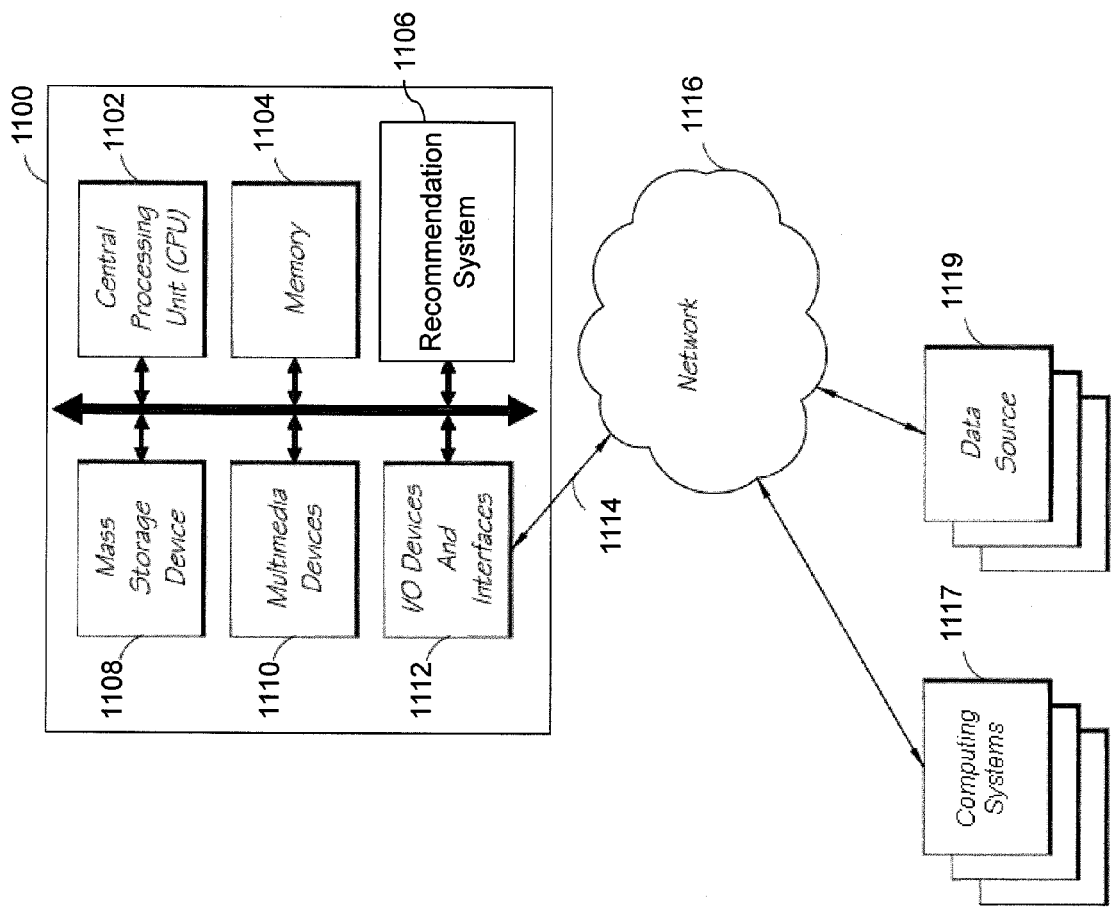
FIG. 11 is a block diagram depicting an embodiment of a computer hardware system configured to run software for implementing one or more embodiments of the recommendation and user access point systems described herein.

FIG. 11 is a block diagram depicting an embodiment of a computer hardware system configured to run software for implementing one or more embodiments of the recommendation systems described herein.

In some embodiments, the computer clients and/or servers described above take the form of a computing system 1100 illustrated in FIG. 11, which is a block diagram of one embodiment of a computing system that is in communication with one or more computing systems 1117 and/or one or more data sources 1119 via one or more networks 1116. The computing system 1100 may be used to implement one or more of the systems and methods described herein. In addition, in one embodiment, the computing system 1100 may be configured to manage access or administer a software application. While FIG. 11 illustrates one embodiment of a computing system 1100, it is recognized that the functionality provided for in the components and modules of computing system 1100 may be combined into fewer components and modules or further separated into additional components and modules.

Recommendation System Module

In one embodiment, the computing system 1100 comprises a recommendation system module 1106 that carries out the functions described herein with reference to generating recommendations of unique items, including any one of the recommendation techniques described above. In some embodiments, the computing system 1100 additionally comprises a training engine, decomposition training generator, collaborative filter training generator, customization training generator, condition training generator, status training generator, recommendation compilation engine, penalty computation engine, decomposition filter, collaborative filter, customization filter, condition filter, status filter, normalization filter, dissimilarity penalty calculator, user access point system module, item selection receiver, and/or display interface that carries out the functions described herein with reference to generating recommendations of unique items. The recommendation system module 1106 and/or other modules may be executed on the computing system 1100 by a central processing unit 1102 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 1100 also comprises a mainframe computer suitable for controlling and/or communicating with large databases, performing high volume transaction processing, and generating reports from large databases. The computing system 1100 also comprises a central processing unit ("CPU") 1102, which may comprise a conventional microprocessor. The computing system 1100 further comprises a memory 1104, such as random access memory ("RAM") for temporary storage of information and/or a read only memory ("ROM") for permanent storage of information, and a mass storage device 1108, such as a hard drive, diskette, or optical media storage device. Typically, the modules of the computing system 1100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 1100 comprises one or more commonly available input/output (I/O) devices and interfaces 1112, such as a keyboard, mouse, touchpad, and printer. In one embodiment, the I/O devices and interfaces 1112 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 1112 comprise a microphone and/or motion sensor that allow a user to generate input to the computing system 1100 using sounds, voice, motion, gestures, or the like. In the embodiment of FIG. 11, the I/O devices and interfaces 1112 also provide a communications interface to various external devices. The computing system 1100 may also comprise one or more multimedia devices 1110, such as speakers, video cards, graphics accelerators, and microphones, for example.

Computing System Device/Operating System

The computing system 1100 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 1100 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 1100 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 11, the computing system 1100 is coupled to a network 1116, such as a LAN, WAN, or the Internet, for example, via a wired, wireless, or combination of wired and wireless, communication link 1114. The network 1116 communicates with various computing devices and/or other electronic devices via wired or wireless communication links. In the embodiment of FIG. 11, the network 1116 is communicating with one or more computing systems 1117 and/or one or more data sources 1119.

Access to the recommendation system module 1106 of the computer system 1100 by computing systems 1117 and/or by data sources 1119 may be through a web-enabled user access point such as the computing systems' 1117 or data source's 1119 personal computer, cellular phone, smartphone, laptop, tablet computer, e-reader device, audio player, or other device capable of connecting to the network 1116. Such a device may have a browser module that is implemented as a module that uses text, graphics, audio, video, and other media to present data and to allow interaction with data via the network 1116.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 1112 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1100 may comprise a physical or logical connection established between a remote microprocessor and a mainframe host computer for the express purpose of uploading, downloading, or viewing interactive data and databases on-line in real time. The remote microprocessor may be operated by an entity operating the computer system 1100, including the client server systems or the main server system, an/or may be operated by one or more of the data sources 1119 and/or one or more of the computing systems 1117. In some embodiments, terminal emulation software may be used on the microprocessor for participating in the micro-mainframe link.

In some embodiments, computing systems 1117 who are internal to an entity operating the computer system 1100 may access the recommendation system module 1106 internally as an application or process run by the CPU 1102.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in FIG. 11, the network 1116 may communicate with other data sources or other computing devices. The computing system 1100 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A computer-based recommendation system for generating recommendations of unique items, the recommendation system comprising:
   one or more computer readable storage devices configured to store:
      a plurality of computer executable instructions;
      an items information database containing data relating to a plurality of unique items;
   one or more hardware computer processors in communication with the one or more computer readable storage devices and configured to execute the plurality of computer executable instructions in order to cause the computer system to:
      receive an input from a user that comprises user-expressed preferences associated with the plurality of unique items;
      calculate a customization score for each unique item in the plurality of unique items, the customization score at least partially based on at least one customization attribute associated with that unique item;
      calculate a condition score for each unique item in the plurality of unique items, the condition score at least partially based on at least one condition attribute associated with that unique item;
      generate a dissimilarity penalty for each unique item in the plurality of unique items by combining the customization score and the condition score for that unique item, the dissimilarity penalty at least partially generated based on a magnitude of dissimilarity between the unique item and the user-expressed preferences; and
      generate a recommendation of unique items by ranking at least a portion of the plurality of the unique items based at least partially on the calculated dissimilarity penalties.

2. The computer-based recommendation system of claim 1, wherein the user-expressed preferences comprise filters that the user has applied, wherein the filters are configured to filter the plurality of unique items for display by a display interface, and wherein the one or more hardware computer processors are further configured to execute the plurality of computer executable instructions in order to:
   generate user interface data for rendering the display interface, wherein the display interface displays the filtered unique items based on the recommendation of unique items.

3. The computer-based recommendation system of claim 1, wherein the unique items comprise one of the following types of items: used automobiles, existing homes, real estate, household goods, customized electronics, customized goods.

4. The computer-based recommendation system of claim 1, wherein the user-expressed preferences comprise a plurality of attributes, the plurality of attributes comprising at least one customization attribute and at least one condition attribute.

5. The computer-based recommendation system of claim 1, wherein the unique items comprise used automobiles and the user-expressed preferences comprise a plurality of attributes associated with used automobiles.

6. The computer-based recommendation system of claim 1, wherein the at least one customization attribute describes at least one of the following: an engine size, a type of material used for an interior of an automobile, a color of an automobile.

7. The computer-based recommendation system of claim 1, wherein the at least one condition attribute of the selected and alternative items describes at least one of the following: a number of miles an automobile has been driven, whether an automobile's title is clean, whether an automobile has been in an accident.

8. The computer-based recommendation system of claim 1, wherein the calculation of the customization score comprises a Mahalanobis distance calculation.

9. The computer-based recommendation system of claim 1, wherein the customization score comprises an estimated price impact.

10. The computer-based recommendation system of claim 1, wherein calculating the condition score comprises a Mahalanobis distance calculation.

11. The computer-based recommendation system of claim 1, wherein the condition score comprises an estimated price impact.

12. The computer-based recommendation system of claim 1, wherein the items information database is configured to store data relating to at least 1,000 unique items.

13. The computer-based recommendation system of claim 1, wherein the plurality of unique items comprises at least 100 unique items, and generating the recommendation of unique items occurs in real time.

14. The computer-based recommendation system of claim 1, wherein the condition score for each unique item represents an estimated preference impact based on at least one status attribute associated with that unique item.

15. The computer-based recommendation system of claim 14, wherein the at least one status attribute describes at least one of the following: a listing price, a geographic location, a type of seller.

16. The computer-based recommendation system of claim 1, wherein the one or more hardware computer processors are further configured to execute the plurality of computer executable instructions in order to cause the computer system to:
   calculate a probability score for each unique item in the plurality of unique items, the probability score at least partially based on a probability that the user will be interested in that unique item based on the user-expressed preferences; and
   wherein the dissimilarity penalty for each unique item is at least partially generated based on combining that unique item's probability score, customization score and condition score.

17. The computer-based recommendation system of claim 1, wherein the user-expressed preferences comprise a search query.

18. The computer-based recommendation system of claim 1, wherein the one or more hardware computer processors are further configured to execute the plurality of computer executable instructions in order to cause the computer system to access the items information database.

19. A computer-implemented method for generating recommendations of unique items, the computer-implemented method comprising:
   receiving an input from a user that comprises user-expressed preferences associated with a plurality of unique items;
   calculating, using a computer system, a customization score for each unique item in the plurality of unique items, the customization score at least partially based on at least one customization attribute associated with that unique item;
   calculating, using the computer system, a condition score for each unique item in the plurality of unique items, the condition score at least partially based on at least one condition attribute associated with that unique item;
   generating, using the computer system, a dissimilarity penalty for each unique item in the plurality of unique items by combining the customization score and the condition score for that unique item, the dissimilarity penalty at least partially generated based on a magnitude of dissimilarity between the unique item and the user-expressed preferences; and
   generating, using the computer system, a recommendation of unique items by ranking at least a portion of the plurality of the unique items based at least partially on the calculated dissimilarity penalties;
   wherein the computer system comprises a computer processor and electronic memory.

20. The computer-implemented method of claim 19, wherein the unique items comprise one of the following types of items: used automobiles, existing homes, real estate, household goods, customized electronics, customized goods.

* * * * *